(12) United States Patent
Keromytis et al.

(10) Patent No.: US 11,106,799 B2
(45) Date of Patent: *Aug. 31, 2021

(54) METHODS, MEDIA, AND SYSTEMS FOR DETECTING AN ANOMALOUS SEQUENCE OF FUNCTION CALLS

(71) Applicants: Angelos D. Keromytis, New York, NY (US); Salvatore J. Stolfo, New York, NY (US)

(72) Inventors: Angelos D. Keromytis, New York, NY (US); Salvatore J. Stolfo, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/579,318

(22) Filed: Sep. 23, 2019

(65) Prior Publication Data

US 2020/0019705 A1 Jan. 16, 2020

Related U.S. Application Data

(63) Continuation of application No. 15/247,154, filed on Aug. 25, 2016, now Pat. No. 10,423,788, which is a
(Continued)

(51) Int. Cl.
*G06F 21/56* (2013.01)
*G06F 21/57* (2013.01)
(Continued)

(52) U.S. Cl.
CPC ............ *G06F 21/577* (2013.01); *G06F 11/08* (2013.01); *G06F 11/3688* (2013.01);
(Continued)

(58) Field of Classification Search
CPC .......... H04L 63/14–1483; G06F 21/55; G06F 21/577; G06F 11/08; G06F 11/3688; G06F 21/566

See application file for complete search history.

(56) References Cited

U.S. PATENT DOCUMENTS 5,398,196 A 3/1995 Chambers
5,696,822 A 12/1997 Nachenberg
(Continued)

FOREIGN PATENT DOCUMENTS

GB 2277151 B 6/1997
JP 2002368820 A 12/2002
KR 1020010089062 9/2001

OTHER PUBLICATIONS

W.H. Sanders, "Integrated frameworks for multi-level and multi-formalism modeling", IEEE, Proceedings 8th International Workshop on Petri Nets and Performance Models, Date of Conference: Sep. 8-10, 1999, Date added to IEEE: Aug. 6, 2002 (Year: 2002).*
(Continued)

*Primary Examiner* — Michael Maskulinski
(74) *Attorney, Agent, or Firm* — Byrne Poh LLP

(57) ABSTRACT

Methods, media, and systems for detecting an anomalous sequence of function calls are provided. The methods can include compressing a sequence of function calls made by the execution of a program using a compression model; and determining the presence of an anomalous sequence of function calls in the sequence of function calls based on the extent to which the sequence of function calls is compressed. The methods can further include executing at least one known program; observing at least one sequence of function calls made by the execution of the at least one known program; assigning each type of function call in the at least one sequence of function calls made by the at least one
(Continued)

known program a unique identifier; and creating at least part of the compression model by recording at least one sequence of unique identifiers.

19 Claims, 9 Drawing Sheets

Related U.S. Application Data continuation of application No. 14/185,175, filed on Feb. 20, 2014, now Pat. No. 9,450,979, which is a continuation of application No. 13/942,632, filed on Jul. 15, 2013, now Pat. No. 8,694,833, which is a continuation of application No. 13/397,670, filed on Feb. 15, 2012, now Pat. No. 8,489,931, which is a continuation of application No. 12/447,946, filed as application No. PCT/US2007/083003 on Oct. 30, 2007, now Pat. No. 8,135,994.

(60) Provisional application No. 60/856,669, filed on Nov. 3, 2006, provisional application No. 60/855,704, filed on Oct. 30, 2006.

(51) Int. Cl.
*G06F 11/08* (2006.01)
*G06F 21/55* (2013.01)
*G06F 11/36* (2006.01)
*G06N 7/00* (2006.01)
*H04L 29/06* (2006.01)

(52) U.S. Cl.
CPC ............ *G06F 21/55* (2013.01); *G06F 21/566* (2013.01); *G06N 7/005* (2013.01); *G06F 2221/033* (2013.01); *H04L 63/1425* (2013.01)

(56) References Cited

U.S. PATENT DOCUMENTS

| | | |
|---|---|---|
| 5,857,071 A | 1/1999 | Haley et al. |
| 5,964,889 A | 10/1999 | Nachenberg |
| 5,968,113 A | 10/1999 | Haley et al. |
| 5,978,917 A | 11/1999 | Chi |
| 6,067,535 A | 5/2000 | Hobson et al. |
| 6,079,031 A | 6/2000 | Haley et al. |
| 6,154,876 A | 11/2000 | Haley et al. |
| 6,195,024 B1 | 2/2001 | Fallon |
| 6,347,374 B1 | 2/2002 | Drake et al. |
| 6,357,008 B1 | 3/2002 | Nachenberg |
| 6,681,331 B1 | 1/2004 | Munson |
| 6,698,016 B1 | 2/2004 | Ghizzoni |
| 6,718,469 B2 | 4/2004 | Pak et al. |
| 6,775,780 B1 | 8/2004 | Muttik |
| 6,952,776 B1 | 10/2005 | Chess |
| 6,970,924 B1 | 11/2005 | Chu et al. |
| 6,983,380 B2 | 1/2006 | Ko |
| 7,065,657 B1 | 6/2006 | Moran |
| 7,069,583 B2 | 6/2006 | Yann et al. |
| 7,072,876 B1 | 7/2006 | Michael |
| 7,093,239 B1 | 8/2006 | Made |
| 7,096,215 B2 | 8/2006 | Bates et al. |
| 7,146,305 B2 | 12/2006 | Made |
| 7,155,708 B2 | 12/2006 | Hammes et al. |
| 7,185,367 B2 | 2/2007 | Munson |
| 7,225,343 B1 | 5/2007 | Honig et al. |
| 7,331,062 B2 | 2/2008 | Alagna et al. |
| 7,340,666 B1 | 3/2008 | Wright et al. |
| 7,356,736 B2 | 4/2008 | Natvig |
| 7,373,524 B2 | 5/2008 | Motsinger et al. |
| 7,392,543 B2 | 6/2008 | Szor |
| 7,409,717 B1 | 8/2008 | Szor |
| 7,412,723 B2 | 8/2008 | Blake et al. |
| 7,448,084 B1 | 11/2008 | Apap et al. |
| 7,487,544 B2 | 2/2009 | Schultz et al. |
| 7,490,268 B2 | 2/2009 | Keromytis et al. |
| 7,496,898 B1 | 2/2009 | Vu |
| 7,523,500 B1 | 4/2009 | Szor et al. |
| 7,526,758 B2 | 4/2009 | Hasse et al. |
| 7,603,715 B2 | 10/2009 | Costa et al. |
| 7,639,714 B2 | 12/2009 | Stolfo et al. |
| 7,644,441 B2 | 1/2010 | Schmid et al. |
| 7,647,589 B1 | 1/2010 | Dobrovolskiy et al. |
| 7,716,736 B2 | 5/2010 | Radatti et al. |
| 7,735,138 B2 | 6/2010 | Zhao |
| 7,748,038 B2 | 6/2010 | Olivier et al. |
| 7,818,781 B2 | 10/2010 | Golan et al. |
| 7,832,012 B2 | 11/2010 | Huddleston |
| 7,877,807 B2 | 1/2011 | Shipp |
| 7,913,306 B2 | 3/2011 | Apap et al. |
| 7,979,907 B2 | 7/2011 | Schultz et al. |
| 8,074,115 B2 | 12/2011 | Stolfo et al. |
| 8,108,929 B2 | 1/2012 | Agrawal |
| 8,135,994 B2 | 3/2012 | Keromytis et al. |
| 8,341,743 B2 | 12/2012 | Rogers et al. |
| 8,528,086 B1 | 9/2013 | Aziz |
| 8,601,322 B2 | 12/2013 | Stolfo et al. |
| 9,450,979 B2 * | 9/2016 | Keromytis .......... H04L 63/1425 |
| 10,423,788 B2 * | 9/2019 | Keromytis .......... H04L 63/1425 |
| 2002/0013691 A1 | 1/2002 | Warnes |
| 2002/0026605 A1 | 2/2002 | Terry |
| 2002/0095607 A1 | 7/2002 | Lin-Hendel |
| 2002/0133721 A1 | 9/2002 | Adjaoute |
| 2002/0194490 A1 | 12/2002 | Halperin et al. |
| 2003/0065926 A1 | 4/2003 | Schultz et al. |
| 2003/0070003 A1 | 4/2003 | Chong et al. |
| 2003/0149700 A1 | 8/2003 | Bolt |
| 2003/0159090 A1 | 8/2003 | Wray et al. |
| 2003/0200462 A1 | 10/2003 | Munson |
| 2004/0042506 A1 | 3/2004 | Fallon et al. |
| 2004/0153644 A1 | 8/2004 | McCorkendale et al. |
| 2004/0153823 A1 | 8/2004 | Ansari |
| 2004/0163079 A1 | 8/2004 | Noy et al. |
| 2004/0205474 A1 | 10/2004 | Eskin et al. |
| 2004/0260947 A1 | 12/2004 | Brady et al. |
| 2005/0038827 A1 | 2/2005 | Hooks |
| 2005/0086333 A1 | 4/2005 | Chefalas et al. |
| 2005/0086630 A1 | 4/2005 | Chefalas et al. |
| 2005/0108562 A1 | 5/2005 | Khazan et al. |
| 2005/0198470 A1 | 9/2005 | Kirovsk et al. |
| 2005/0259678 A1 | 11/2005 | Gaur |
| 2005/0273854 A1 | 12/2005 | Chess et al. |
| 2006/0010495 A1 | 1/2006 | Cohen et al. |
| 2006/0021054 A1 | 1/2006 | Costa et al. |
| 2006/0053180 A1 | 3/2006 | Alon et al. |
| 2006/0156380 A1 | 7/2006 | Gladstone et al. |
| 2006/0168329 A1 | 7/2006 | Tan et al. |
| 2006/0195745 A1 | 8/2006 | Keromytis et al. |
| 2006/0264694 A1 | 11/2006 | Viole et al. |
| 2006/0265694 A1 | 11/2006 | Chilimbi et al. |
| 2006/0288415 A1 | 12/2006 | Wong |
| 2007/0006300 A1 | 1/2007 | Zamir et al. |
| 2007/0028220 A1 | 2/2007 | Miller et al. |
| 2007/0283338 A1 | 12/2007 | Gupta et al. |
| 2008/0016574 A1 | 1/2008 | Tomaselli |
| 2008/0148398 A1 | 7/2008 | Mezack et al. |
| 2009/0013316 A1 | 1/2009 | Martin |
| 2009/0037682 A1 | 2/2009 | Armstrong et al. |

OTHER PUBLICATIONS

Syed et al., "Handling Concept Drifts in Incremental Learning with Support Vector Machines", ACM, 1999, pp. 317-321 (Year: 1999).*

Aleph One, "Smashing the Stack for Fun and Profit", In Phrack, vol. 7, No. 49, Nov. 1996, pp. 1-25.

Amarasinghe, S., "On the Run—Building Dynamic Program Modifiers for Optimization, Introspection, and Security", In Proceedings of the Conference on Programming Language Design and Implementation, Berlin, DE, Jun. 17-19, 2002, pp. 1-2.

Anderson, D. et al., "Next-Generation Intrusion Detection Expert System (NIDES): A Summary", Technical Report, SRI International, May 1995, pp. 1-47.

(56) References Cited

OTHER PUBLICATIONS

Apap, F. et al., "Detecting Malicious Software by Monitoring Anomalous Windows Registry Accesses", In Proceedings of the 5th International Symposium on Recent Advances in Intrusion Detection (RAID '02), Zurich, CH, Oct. 16-18, 2002, pp. 36-53.
Armstrong, D. et al., "Controller-Based Autonomic Defense System", In Proceedings of the 3rd Defense Advanced Research Project Agency Information Survivability Conference and Exposition, Washington, DC, US, Apr. 22-24, 2003, pp. 21-23.
Arnold, W. and Tesauro, T., "Automatically Generated WIN32 Heuristic Virus Detection", In Virus Bulletin Conference, Orlando, FL, US, Sep. 28-29, 2000, pp. 51-60.
Ashcraft, K. and Engler, D., "Using Programmer-Written Compiler Extensions to Catch Security Holes", In Proceedings of the 2002 IEEE Symposium on Security and Privacy (S&P '02), Berkeley, CA, US, May 12-15, 2002, pp. 143-159.
Avizienis, A., "The N-Version Approach to Fault-Tolerant Software", In IEEE Transactions on Software Engineering, vol. SE-11, No. 12, Dec. 1985, pp. 1491-1501.
Axelsson, S., "A Preliminary Attempt to Apply Detection and Estimation Theory to Intrusion Detection", Technical Report, Department of Computer Engineering, Chalmers University of Technology, Mar. 13, 2000, pp. 1-11.
Bace, R.G., "Intrusion Detection", 1st edition, Macmillan Technical Publishing, Jan. 2000, pp. 1-322.
Baratloo, A. et al., "Transparent Run-Time Defense Against Stack Smashing Attacks", In Proceedings of the 2000 USENIX Annual Technical Conference (ATEC '00), San Diego, CA, US, Jun. 18-23, 2000, pp. 251-262.
Barbara, D. et al., "An Architecture for Anomaly Detection", In Applications of Data Mining in Computer Security, Advances in Information Security, vol. 6, May 31, 2002, pp. 63-76.
Barrantes, E.G. et al., "Randomized Instruction Set Emulation to Disrupt Binary Code Injection Attacks", In Proceedings of the 10th ACM Conference on Computer and Communications Security Conference (CCS '03), Washington, DC, US, Oct. 27-30, 2003, pp. 281-289.
Bauer, E. et al., "An Empirical Comparison of Voting Classification Algorithms: Bagging, Boosting, and Variants", In Machine Learning, vol. 36, No. 1-2, Jul. 1, 1999, pp. 105-139.
Bell, T. et al., excerpts from "Modeling for Text Compression", In ACM Computing Surveys, vol. 21, No. 4, Dec. 1989, pp. 557-591.
Bellovin, S., "Distributed Firewalls", In ;login: Magazine, Nov. 1999, pp. 37-39.
Bhatkar, S. et al., "Address Obfuscation: An Efficient Approach to Combat a Broad Range of Memory Error Exploits", In Proceedings of the 12th USENIX Security Symposium (SSYM '03), Washington, DC, US, Aug. 4-8, 2003, pp. 105-120.
Bhattacharyya, M. et al., "MET: An Experimental System for Malicious Email Tracking", In Proceedings of the 2002 Workshop on New Security Paradigms, Virginia Beach, VA, US, Sep. 23-26, 2002, pp. 3-10.
Bowyer, K. et al., "A Parallel Decision Tree Builder for Mining Very Large Visualization Datasets", In Proceedings of the IEEE International Conference on Systems, Man, and Cybernetics, Nashville, TN, US, Oct. 8-11, 2000, pp. 1888-1893.
Breiman, L., "Bagging Predictors", In Machine Learning, vol. 24, No. 2, Aug. 1, 1996, pp. 123-140.
Breiman, L., "Random Forests", In Machine Learning, vol. 45, No. 1, Oct. 1, 2001, pp. 5-32.
Brilliant, S. et al., "Analysis of Faults in an N-Version Software Experiment", In IEEE Transactions on Software Engineering, vol. 16, No. 2, Feb. 1990, pp. 238-247.
Bruening, D. et al., "An Infrastructure for Adaptive Dynamic Optimization", In Proceedings of the 1st IEEE Association for Computing Machinery International Symposium on Code Generation and Optimization, San Francisco, CA, US, Mar. 23-26, 2003, pp. 265-275.
Brunner, J., "The Shockwave Rider", Del Rey Books, Canada, 1975, pp. 1-248.
Bulba et al., "Bypassing StackGuard and StackShield", In Phrack Magazine, No. 56, May 1, 2000, pp. 1-8.
Caida, "OC48 Analysis-Trace Data Stratified by Applications", Technical Report, Center for Applied Internet Data Access, last modified Jul. 18, 2013, p. 1, available at: http://www.caida.org/research/traffic-analysis/byapplication/oc48/port_analysis_app.XML.
Candea, G. and Fox, A., "Crash-Only Software", In Proceedings of the 9th Workshop on Hot Topics in Operating Systems (HotOS-IX), Lihue (Kauai), HI, US, May 18-21, 2003, pp. 67-72.
Cannady, J. and Harrell, J. "A Comparative Analysis of Current Intrusion Detection Technologies", In Proceedings of the Fourth Conference on Technology for Information Security (TISC '96), May 1996, pp. 1-17.
Cannady, J.D., excerpts from "An Adaptive Neural Network Approach to Intrusion Detection and Response", Nova Southeastern University, 2000, pp. 19-21.
Cert, "'Code Red' Worm Exploiting Buffer Overflow in IIS Indexing Service DLL", Technical Report, CERT Advisory CA-2001-19, Jul. 19, 2001, pp. 1-3, available at: http://www.cert.org/advisories/CA-2001-19.html.
CERT, "Exploitation of Vulnerabilities in Microsoft RPC Interface", Technical Report, CERT Advisory CA-2003-19, Jul. 31, 2003, pp. 1-3.
CERT, "MS-SQL Server Worm", last updated Jan. 25, 2003, pp. 1-3, available at: http://www.cert.org/advisories/CA-2003-04.html.
CERT, "W32/Blaster Worm", last updated Aug. 14, 2003, pp. 1-3, available at: http://www.cert.org/advisories/CA-2003-20.html.
Chan, P. et al., "A Machine Learning Approach to Anomaly Detection", Technical Report, Florida Institute of Technology, Mar. 2003, pp. 1-13.
Chaturvedi, A. et al., "Improving Attack Detection in Host-Based IDS by Learning Properties of System Call Arguments", In Proceedings of the IEEE Symposium on Security and Privacy, Oakland, CA, US, May 8-11, 2005, pp. 1-19.
Chebrolu, S., excerpts from "Feature Deduction and Ensemble Design of Intrusion Detection Systems", In Computers & Security, vol. 24, Jun. 2005, pp. 295-307.
Chen, H. and Wagner, D., "MOPS: An Infrastructure for Examining Security Properties of Software", In Proceedings of the 9th ACM Conference on Computer and Communications Security (CCS '02), Washington, DC, US, Nov. 18-22, 2002, pp. 235-244.
Chen, P. M. and Noble, B.D., "When Virtual is Better Than Real", In Proceedings of the 8th Workshop on Hot Topics in Operating System (HotOS '01), Elmau/Oberbayern, DE, May 20-23, 2001, pp. 133-138.
Chess, B., "Improving Computer Security Using Extended Static Checking", In Proceedings of the IEEE Symposium on Security and Privacy, Berkeley, CA, US, May 12-15, 2002, pp. 160-173.
Chew, M. and Song, D., "Mitigating Buffer Overflows by Operating System Randomization", Technical Report CMU-CS-02-197, Carnegie Mellon University, Dec. 2002, pp. 1-11.
Cho, S.B. and Han, S-J., "Two Sophisticated Techniques to Improve HMM-Based Intrusion Detection Systems", In Proceedings of the Sixth International Symposium on Recent Advances in Intrusion Detection (RAID '03), Pittsburgh, PA, US, Sep. 8-10, 2003, pp. 207-219.
Christodorescu, M. and Jha, S., "Static Analysis of Executables to Detect Malicious Patterns", In Proceedings of the 12th USENIX Security Symposium (SSYM '03), Washington, DC, US, Aug. 4-8, 2003, pp. 169-186.
Cisco Systems, Inc., "Using Network-Based Application Recognition and Access Control Lists for Blocking the 'Code Red' Worm at Network Ingress Points", Technical Report No. 27842, Aug. 2, 2006, pp. 1-8.
Cohen, F., "Computer Viruses: Theory and Experiments", In Computers & Security, vol. 6, No. 1, Feb. 1987, pp. 22-35.
Computer Economics, "Malicious Code Attacks Had $13.2 Billion Economic Impact in 2001", In Computer Economics, Sep. 2002, p. 1, available at: http://www.computereconomics.com/cei/preess/pr92191.html.
Conover, M., "wOOwOO On Heap Overflows", Technical Report, Jan. 1999, pp. 1-17, available at: http://www.w00w00.org/articles.html.

(56) References Cited

OTHER PUBLICATIONS

Cowan, C. et al., "FormatGuard: Automatic Protection From Printf Format String Vulnerabilites", In Proceedings of the 10th USENIX Security Symposium, Washington, DC, US, Aug. 13-17, 2001, pp. 191-199.

Cowan, C. et al., "PointGuard: Protecting Pointers From Buffer Overflow Vulnerabilities", In Proceedings of the 12th USENIX Security Symposium (SSYM '03), Washington, DC, US, Aug. 4-8, 2003, pp. 91-104.

Cowan, C. et al., "Stackguard: Automatic Adaptive Detection and Prevention of Buffer-Overflow Attacks", In Proceedings of the 7th USENIX Security Symposium (SSYM '98), San Antonio, TX, US, Jan. 26-29, 1998, pp. 63-78.

Cowan, C. et al., "SubDomain: Parsimonious Server Security", In Proceedings of the 14th USENIX System Administration Conference (LISA '00), New Orleans, LA, US, Dec. 3-8, 2000, pp. 1-20.

Crosby, S. et al., "Denial of Service via Algorithmic Complexity Attacks", In Proceedings of the 12th USENIX Security Symposium, Washington, DC, US, Aug. 4-8, 2003, pp. 29-44.

Cult Dead Cow, "Back Orifice", last accessed Jul. 2, 2013, pp. 1-2, available at: http://www.cultdeadcow.com/tools/bo.html.

Damashek, M., "Gauging Similarity with N-Grams: Language-Independent Categorization of Text", In Science, vol. 267, No. 5199, Feb. 10, 1995, pp. 843-848.

Dark-E, "AIM Recovery", last accessed Jul. 2, 2013, p. 1, available at: http://www.dark-e.com/des/software/aim/index.shtml.

Debray, S. and Evans, W., "Profile-Guided Code Compression", In Proceedings of the 2002 ACM SIGPLAN Conference on Programming Language Design and Implementation (PLDI '02), Berlin, DE, Jun. 17-19, 2002, pp. 95-105.

Demsky, B. and Rinard, M.C., "Automatic Data Structure Repair for Self-Healing Systems", In Proceedings of the 1st Workshop on Algorithms and Architectures for Self-Managing Systems, San Diego, CA, US, Jun. 11, 2003, pp. 1-6.

Demsky, B. et al., "Automatic Detection and Repair of Errors in Data Structures", In Proceedings of the ACM's Special Interest Group on Programming Languages' Conference on Object Oriented Programming, Systems, Languages, and Applications, Anaheim, CA, US, Oct. 26-30, 2003, pp. 78-95.

Denning, D., "An Intrusion Detection Model", In IEEE Transactions on Software Engineering, vol. SE-13, No. 2, Feb. 1987, pp. 222-232.

Diamond CS, "Diamond Computer System Products—DiamondCS RegistryProt", Jan. 23, 2001, pp. 1-2, available at: https://web.archive.org/web/20010123222600/http://www.diamondcs.com.au/html/registryprot.htm.

Didaci, L. et al., "Ensemble Learning for Intrusion Detection in Computer Networks", In Proceedings of the 8th Conference of the Italian Association of Artificial Intelligence (AIAA), Siena, IT, Sep. 2002, pp. 1-10.

Dierks, T. and Allen, C., "The TLS Protocol Version 1.0", Technical Report, Internet Engineering Task Force: RFC 2246, Jan. 1999, pp. 1-69, available at: http://www.ietf.org/rfc/rfc2246.txt.

Dietterich, T., "Ensemble Methods in Machine Learning", In Lecture Notes in Computer Science, vol. 1857, Dec. 2000, pp. 1-15.

Dietterich, T.G., "An Experimental Comparison of Three Methods for Constructing Ensembles of Decision Trees: Bagging, Boosting, and Randomization", In Machine Learning, vol. 40, No. 2, Aug. 1999, pp. 139-157.

Dolan-Gavitt, B., "Forensic Analysis of the Windows Registry in Memory", In Digital Investigation, vol. 5, Aug. 2008, pp. 526-532.

Du, W., "Security Relevancy Analysis on the Registry of Windows NT 4.0", In Proceedings of the 15th Annual Computer Security Applications Conference (ACSAC '99), Phoenix, AZ, US, Dec. 6-10, 1999, pp. 331-338.

Dumouchel, W., "Computer Intrusion Detection Based on Bayes Factors for Comparing Command Transition Probabilities", Technical Report TR91, National Institute of Statistical Sciences, Feb. 1999, pp. 1-14.

Dunlap, G. et al., "ReVirt: Enabling Intrusion Analysis Through Virtual-Machine Logging and Replay", In Proceedings of the Fifth Symposium on Operating Systems Design and Implementation, Boston, MA, US, Dec. 9-11, 2002, pp. 211-224.

Endler, D., "Intrusion Detection Applying Machine Learning to Solaris Audit Data", In Proceedings of the 14th Annual Computer Security Applications Conference, Phoenix, AZ, US, Dec. 7-11, 1998, pp. 268-279.

Endler, D., "Intrusion Detection Using Solaris' Basic Security Module", last updated Nov. 3, 2010, pp. 1-8, available at: http://www.symantec.com/connect/articles/intrusion-detection-using-solaris-basic-security-module.

Engler, D. and Ashcraft, K., "RacerX: Effective, Static Detection of Race Conditions and Deadlocks", In Proceedings of the ACM Symposium on Operating Systems Principles (SOSP '03), Bolton Landing, NY, US, Oct. 19-22, 2003, pp. 237-252.

Eskin, E., "Adaptive Model Generation for Intrusion Detection Systems", In the Workshop on Intrusion Detection Systems ("WIDS"), 7th ACM Conference on Computer and Communications Security, Athens, GR, Nov. 1, 2000, pp. 1-14.

Eskin, E., "Anomaly Detection Over Noisy Data Using Learned Probability Distributions", In Proceedings of the 17th International Conference on Machine Learning, Stanford, CA, US, Jun. 29-Jul. 2, 2000, pp. 255-262.

Etoh, J., "GCC Extension for Protecting Applications From Stack-Smashing Attacks", Technical Report, IBM Research, Aug. 22, 2005, pp. 1-3, available at: http://www.trl.ibm.com/projects/security/ssp.

Fan, W. and Stolfo, S.J., "Ensemble-based Adaptive Intrusion Detection", In Proceedings of the Second SIAM International Conference on Data Mining, Arlington, VA, US, Apr. 11-13, 2002, pp. 41-58.

Fan, W. et al., "Using Artificial Anomalies to Detect Unknown and Known Network Intrusions", In Proceedings of IEEE International Conference on Data Mining (ICDM '01), San Jose, CA, US, Nov. 29-Dec. 2, 2001, pp. 123-130.

Fan, W., "Systematic Data Selection to Mine Concept-Drifting Data Streams", In Proceedings of the 10th ACM SIGKDD International Conference on Knowledge Discovery and Data Mining, Seattle, WA, US, Aug. 22-25, 2004, pp. 128-137.

Feng, H.H. et al., "Anomaly Detection Using Call Stack Information", In Proceedings of the IEEE Symposium on Security and Privacy (S&P'03), Oakland, CA, US, May 11-14, 2003, pp. 62-77.

Flack, C. and Atallah, M.J., "A Toolkit for Modeling and Compressing Audit Data", Technical Report, Purdue University, Mar. 10, 1999, pp. 1-25.

Ford, R., "The Future of Virus Detection", Information Security Technical Report, vol. 9, No. 2, Apr.-Jun. 2004, pp. 19-26.

Forrest, S. et al., "A Sense of Self for Unix Processes", In Proceedings of the IEEE Symposium on Security and Privacy, Oakland, CA, US, May 6-8, 1996, pp. 120-128.

Forrest, S. et al., "Building Diverse Computer Systems", In Proceedings of the 6th Workshop on Hot Topics in Operating Systems (HotOS '97), Cape Cod, MA, US, May 5-6, 1997, pp. 67-72.

Frantzen, M. and Shuey, M., "StackGhost: Hardware Facilitated Stack Protection", In Proceedings of the 10th USENIX Security Symposium (SSYM '01), Washington, DC, US, Aug. 13-17, 2001, pp. 55-66.

Friedman, N. et al., "Efficient Bayesian Parameter Estimation in Large Discrete Domains", In Proceedings of the 11th Conference on Advances in Neural Information Processing Systems, Denver, CO, US, Nov. 30-Dec. 5, 1998, pp. 417-423.

Garfinkel, T. et al., "A Virtual Machine Introspection Based Architecture for Intrusion Detection", In Proceedings of the 10th Network and Distributed System Security Symposium (NDSS '03), San Diego, CA, US, Feb. 6-7, 2003, pp. 191-206.

Garfinkel, T., "Traps and Pitfalls: Practical Problems in System Call Interposition Based Security Tools", In Proceedings of the 10th Network and Distributed Systems Security Symposium (NDSS '03), San Diego, CA, US, Feb. 6-7, 2003, pp. 163-176.

Geer, Jr., D., "Monopoly Considered Harmful", In IEEE Security & Privacy, vol. 1, No. 6, Nov. 2003, pp. 14-17.

(56) References Cited

OTHER PUBLICATIONS

Ghosh, A.K. et al., "A Study in Using Neural Networks For Anomaly and Misuse Detection", In Proceedings of the 8th USENIX Security Symposium, Washington, DC, US, Aug. 23-26, 1999, pp. 1-12.
Ghosh, A.K. et al., "Learning Program Behavior Profiles for Intrusion Detection", In Proceedings of the Workshop on Intrusion Detection and Network Monitoring, Santa Clara, CA, US, Apr. 9-12, 1999, pp. 51-62.
Ghosh, A.K. et al., "Using Program Behavior Profiles for Intrusion Detection", In Proceedings of the SANS Third Conference and Workshop on Intrusion Detection and Response, Mar. 1999, pp. 1-7.
Goldberg, I. et al., "A Secure Environment for Untrusted Helper Applications (Confining the Wily Hacker)", In Proceedings of the 6th USENIX Security Symposium (SSYM '96), San Jose, CA, US, Jul. 22-25, 1996, pp. 1-14.
Goth, G., "Addressing the Monoculture", In IEEE Security & Privacy, vol. 99, No. 6, Nov./Dec. 2003, pp. 8-10.
Greyware, "Grr! Greyware Registry Rearguard", Aug. 17, 2000, pp. 1-7, available at: https://web.archive.org/web/20000817031817/http://www.greyware.com/software/grr/.
Grimes, R.A., "Malicious Mobile Code: Virus Protection for Windows", 1st Edition, O'Rielly Media, Newton, MA, Aug. 24, 2001, pp. 45-46.
Hall, L.O. et al., "Comparing Pure Parallel Ensemble Creation Techniques Against Bagging", In Proceedings of the Third IEEE International Conference on Data Mining (ICDM '03), Melbourne, FL, US, Nov. 19-22, 2003, pp. 533-536.
Hangai, S. and Lam, M.S., "Tracking Down Software Bugs Using Automatic Anomaly Detection", In Proceedings of the 24th International Conference on Software Engineering (ICSE '02), Orlando, FL, US, May 19-25, 2002, pp. 291-301.
Hedbom, H. et al., "A Security Evaluation of a Non-Distributed Version of Windows NT", In Proceedings of the Second Nordic Workshop on Secure Computer Systems (NORDSEC '97), Espoo, FI, Nov. 6-7, 1997, pp. 1-29.
Hennessy, J.L. and Patterson, D.A., "Computer Organization and Design: The Hardware/Software Interface," 2nd Edition, Aug. 1997, pp. 1-122.
Hoagland, J. and Staniford, S., "Spade: Silicon Defense", Nov. 2000, pp. 1-4, available at: http://www.silicondefense.com/software/spice.
Hochberg, J.G. et al., " Nadir: A Prototype System for Detecting Network and File System Abuse", Technical Report, Los Alamos National Laboratory, Nov. 1992, pp. 1-22.
Hofmeyr, S. et al., "Intrusion Detection System Using Sequences of System Calls", In Journal of Computer Security, vol. 6, No. 3, Aug. 18, 1998, pp. 151-180.
Hoglund, G.W. et al., excerpts from "The 'ESSENCE' of Intrusion Detection: A Knowledge Based Approach to Security Monitoring and Control", In Procedings of the International Conference in Industrial and Engineering Applications of Artificial Intelligence and Expert Systems, Austin, TX, US, May 31-Jun. 3, 1994, pp. 201-209.
Hollander, Y., "The Future of Web Server Security: Why Your Web Site is Still Vulnerable to Attack", Technical Report, 2001, pp. 1-9.
Holmes, L., "Windows PowerShell Cookbook", 2nd edition, O'Reilly Media, Aug. 2010, pp. 1-4.
Honig, A. et al., "Adaptive Model Generation: An Architecture for the Deployment of Data Mining-Based Intrusion Detection Systems", In Applications of Data Mining in Computer Security, May 2002, pp. 153-194.
Ilgun, K., excerpts from "USTAT: A Real-Time Intrusion Detection System for UNIX", In Proceedings of the 1993 IEEE Computer Society Symposium on Research in Security and Privacy, Oakland, CA, US, May 24-26, 1993, pp. 16-28.
Inoue, H. and Forrest, S., "Anomaly Intrusion Detection in Dynamic Execution Environments", In New Security Paradigms Workshop, Virginia Beach, VA, US, Sep. 23-26, 2002, pp. 52-60.

Inoue, H. and Forrest, S., "Generic Application Intrusion Detection", Technical Report, University of New Mexico, Mar. 26, 2002, pp. 1-14.
International Patent Application No. PCT/US2006/041591, filed Oct. 25, 2006, pp. 1-28.
International Preliminary Report on Patentability dated Apr. 2, 2009 in International Patent Application No. PCT/US2006/041591, pp. 1-6.
International Preliminary Report on Patentability dated May 14, 2009 in International Patent Application No. PCT/US2007/083003, pp. 1-6.
International Search Report and Written Opinion dated Jun. 12, 2008 in International Patent Application No. PCT/US2007/083003, pp. 1-8.
International Search Report and Written Opinion dated Jun. 25, 2008 in International Patent Application No. PCT/US2006/041591, pp. 1-10.
Internet Engineering Task Force, "Intrusion Detection Exchange Format", last updated Oct. 15, 2010, pp. 1-2, available at: http://datatracker.ietf.org/wg/idwg/charter/.
Intrusion Inc. Product Website, Feb. 14, 2001, p. 1, available at: https://web.archive.org/web/20010214040305/http://www.intrusion.com/Products/enterprise.shtml.
Loannidis, J. et al., "Implementing Push-Back: Router-Based Defense Against DDoS Attacks", In Proceedings of the 9th Annual Symposium on Network and Distributed System Security, San Diego, CA, US, Feb. 2002, pp. 1-8.
Loannidis, S. et al., "Implementing a Distributed Firewall", In Proceedings of the 7th ACM Conference on Computerand Communications Security (CCS '00), Athens, GR, Nov. 1-4, 2000, pp. 190-199.
Islam, M.M., "A Constructive Algorithm for Training Cooperative Neural Network Ensembles", In IEEE Transactions on Neural Networks, vol. 14, No. 4, Jul. 2003, pp. 820-834.
Janakiraman, R. et al., "Indra: A Peer-to-Peer Approach to Network Intrusion Detection and Prevention", In Proceedings of the 12th IEEE International Workshops on Enabling Technologies: Infrastructure for Collaborative Enterprises, Linz, AT, Jun. 9-11, 2003, pp. 226-231.
Javitz, H.S. and Valdes, A., "The NIDES Statistical Component: Description and Justification", Technical Report, SRI International, Computer Science Laboratory, Mar. 7, 1994, pp. 1-47.
Jim, T. et al., "Cyclone: A Safe Dialect of C", In Proceedings of the USENIX Annual Technical Conference (ATEC '02), Monterey, CA, US, Jun. 10-15, 2002, pp. 275-288.
Jones, R. et al., "Backwards-Compatible Bounds Checking for Arrays and Pointers in C Programs", In Proceedings of the Third International Workshop on Automated Debugging, Linkoping, SE, May 26-28, 1997, pp. 13-26.
Just, J.E. et al.."Learning Unknown Attacks - A Start", In Proceedings of the 5th International Symposium on Recent Advances in Intrusion Detection (RAID '02), Zurich, CH, Oct. 16-18, 2002, pp. 158-176.
Kane Secure Enterprise, excerpts from "Detecting Administrator and Super User Misuse (Kane 1)", 2000, p. 1.
Kane Secure Enterprise, excerpts from "Detecting Stolen Passwords (Kane II)", 2000, p. 1.
Kane Security Analyst, excerpts from "Kane Security Analyst Features & Benefits (Kane III)", 2000, pp. 2-3.
Kane, excerpts from "Advancing the Art of Intrusion Detection: The KSE Behavioral Profiling System (Kane IV)", 2000, pp. 2-5.
Kc, G.S. et al., "Countering Code-Injection Attacks With Instruction-Set Randomization", In Proceedings of the 10th ACM Computer and Communications Security (CCS '03) Conference, Washington, DC, US, Oct. 27-30, 2003, pp. 272-280.
Kean, E., "Cosak: Code Security Analysis Kit", Technical Report, Drexel University, Jan. 2004, pp. 1-17.
Kent, S. and Atkinson, R., "Security Architecture for the Internet Protocol", Technical Report, RFC 2401, Nov. 1998, pp. 1-60.
Kephart, J.O. et al., "A Biologically Inspired Immune System for Computers", In Artificial Life IV: Proceedings of the 4th International Workshop on the Synthesis and Simulation of Living Systems, Cambridge, MA, US, Jul. 6-8, 1994, pp. 130-139.

(56) References Cited

OTHER PUBLICATIONS

Kim, G.H. and Spafford, E.H., "Experiences with Tripwire: Using Integrity Checkers for Intrusion Detection", Purdue Technical Report, Feb. 1994, pp. 1-15.

Kim, G.H. and Spafford, E.H., "The Design and Implementation of Tripwire: A File System Integrity Checker", Purdue Technical Report, Nov. 1993, pp. 1-23.

Kim, G.H. and Spafford, E.H., "Writing, Supporting, and Evaluating Tripwire: A Publically Available Security Tool", Purdue Technical Report, Mar. 1994, pp. 1-25.

King, S.T. and Chen, P.M., "Backtracking Intrusions", In Proceedings of the 19th ACM Symposium on Operating Systems Principles 2003 (SOSP '03), Bolton Landing, NY, US, Oct. 19-22, 2003, pp. 223-236.

King, S.T. et al., "Operating System Support for Virtual Machines", In Proceedings of the USENIX Annual Technical Conference (ATEC '03), San Antonio, TX, US, Jun. 9-14, 2003, pp. 71-84.

Kiriansky, V. et al., "Secure Execution Via Program Shepherding", In Proceedings of the 11th USENIX Security Symposium (SSYM '02), San Francisco, CA, US, Aug. 5-9, 2002, pp. 191-205.

Klinkenberg, R., "Detecting Concept Drift with Support Vector Machines", In Proceedings of the Seventeenth International Conference on Machine Learning, Stanford, CA, US, June 29-Jul. 2, 2000, pp. 1-8.

Knuth, D.E., "The Art of Computer Programming, vol. 1 Fundamental Algorithms", In Addison-Wesley, vol. 1, No. 3, Jul. 1997, pp. 1-664.

Kodialam, M. and Lakshman, T.V., "Detecting Network Intrusions via Sampling: A Game Theoretic Approach", In Proceedings of the 22nd Annual Joint Conference of the IEEE Computer and Communications Societies (INFOCOM '03), San Franciso, CA, US, Mar. 30-Apr. 3, 2003, pp. 1-10.

Kolter, J.Z. and Maloof, M., "Dynamic Weighted Majority: A New Ensemble Method for Tracking Concept Drift", In Proceedings of the Third International IEEE Conference on Data Mining, Melbourne, FL, US, Nov. 22, 2003, pp. 2-3.

Kolter, J.Z. and Maloof, M., "Learning to Detect Malicious Executables in the Wild", In Proceedings of the 10th International Conference on Knowledge Discovery and Data Mining (KDD '04), Seattle, WA, US, Aug. 22-25, 2004, pp. 470-480.

Korba, J., "Windows NT Attacks for the Evaluation of Intrusion Detection Systems", Thesis, Massachusetts Institute of Technology, Jun. 2000, pp. 1-102.

Kremer, H.S., excerpts from "Real-Time Intrusion Detection for Windows NT Based on Navy IT-21 Audit Policy", Thesis, Naval Post Graduate School, Monterey, CA, US, Sep. 1999, pp. 1-61.

Kruegel, C. et al., "On the Detection of Anomalous System Call Arguments", In Proceedings of the 8th European Symposium on Research in Computer Security, Gjovik, No. Oct. 13-15, 2003, pp. 326-343.

Krugel, C. et al., "Service Specific Anomaly Detection for Network Intrusion Detection", In Proceedings of the 2002 Association for Computing Machinery Symposium on Applied Computing, Madrid, ES, Mar. 10-14, 2002, pp. 201-208.

Lane, T. and Brodley, C.E., "Approaches to Online Learning and Concept Drift for User Identification in Computer Security", In AAAI Technical Report WS-98-07, Jul. 1998, pp. 1-5.

Lane, T. and Brodley, C.E., "Temporal Sequence Learning and Data Reduction for Anomaly Detection", In ACM Transactions on Information and System Security, vol. 2, No. 3, Aug. 1999, pp. 295-331.

Lapadula, L.J., "State of the Art in Anomaly Detection and Reaction", Technical Paper, The MITRE Corporation, Jul. 1999, pp. 1-37.

Larochelle, D. and Evans, D., "Statically Detecting Likely Buffer Overflow Vulnerabilites", In Proceedings of the 10th USENIX Security Symposium (SSYM '01), Washington, DC, US, Aug. 13-17, 2001, pp. 177-190.

Larson, E. et al., "High Coverage Detection of Input-Related Security Faults", In Proceedings of the 12th Conference on USENIX Security Symposium, Washington, DC, US, Aug. 4-8, 2003, pp. 121-136.

Laureano, M. et al., "Intrusion Detection in Virtual Machine Environments", In Proceedings of the 30th Euromicro Conference, Rennes, FR, Aug. 31-Sep. 4, 2004, pp. 520-525.

Lee, J.S. et al., "A Generic Virus Detection Agent on the Internet", In Proceedings of the 30th Annual Hawaii International Conference on System Sciences (HICSS '97), Wailea, HI, US, Jan. 7-10, 1997, pp. 210-219.

Lee, W. and Stolfo, S.J., "Data Mining Approaches For Intrusion Detection", In Proceedings of the 7th Conference on USENIX Security Symposium (SSYM '98), San Antonio, TX, US, Jan. 26-29, 1998, pp. 1-16.

Lee, W. et al., "A Data Mining Framework for Building Intrusion Detection Models", In Proceedings of the 1999 IEEE Symposium on Security and Privacy (S&P '99), Oakland, CA, US, May 9-12, 1999, pp. 120-132.

Lee, W. et al., "A Framework for Constructing Features and Models for Intrusion Detection Systems", In Asssociation of Computing Machinery Transactions on Information and System Security, vol. 3, No. 4, Nov. 2000, pp. 227-261.

Lee, W. et al., "Learning Patterns from Unix Process Execution Traces for Intrusion Detection", In Proceedings of the Association for the Advancement of Artificial Intelligence Workshop: AI Approaches to Fraud Detection, Providence, RI, US, Jul. 27, 1997, pp. 50-56.

Lee, W. et al., "Mining in a Data-Flow Environment: Experience in Network Intrusion Detection", In Proceedings of the ACM's Special Interest Group on Knowledge Discovery and Data Mining International Conference on Knowledge Discovery and Data Mining, San Diego, CA, US, Aug. 15-18, 1999, pp. 114-124.

Lee, W. et al., excerpts from "A Data Mining Approach for Building Cost-Sensitive and Light Intrusion Detection Models", In DARPA Quarterly Review, Nov. 2000, pp. 38-52.

Lee, W., "A Data Mining Framework for Constructing Features and Models for Intrusion Detection Systems", PhD Thesis, Columbia University, Jun. 1999, pp. 1-177.

Lee, W., "Real Time Data Mining-based Intrusion Detection", In DARPA Information Survivability Conference and Exposition Ii (DISCEX'01), Anaheim, CA, US, Jun. 12-14, 2001, pp. 89-100.

Lhee, K. and Chapin, S.J., "Type-Assisted Dynamic Buffer Overflow Detection", In Proceedings of the 11th USENIX Security Symposium (SSYM '02), San Francisco, CA, US, Aug. 5-9, 2002, pp. 81-90.

Liang, Z., "Isolated Program Execution: An Application Transparent Approach for Executing Untrusted Programs", In Proceedings of the 19th Annual Computer Security Applications Conference, Las Vegas, NV, US, Dec. 8-12, 2003, pp. 182-191.

Lin, M. J. et al., "A New Model for Availability in the Face of Self-Propagating Attacks", In Proceedings of the 1998 Workshop on New Security Paradigms (NSPW '98), Charlottesville, VA, US, Sep. 22-25, 1998, pp. 134-137.

Lippmann, R. et al., "The 1999 DARPA Off-Line Intrusion Detection Evaluation", In Computer Networks, vol. 34, No. 4, Oct. 2000, pp. 579-595.

Liston, T., "Welcome To My Tarpit: The Tactical and Strategic Use of LaBrea", Polytechnic, Feb. 17, 2003, pp. 1-4, available at: http://download.polytechnic.edu.na/pub4/download.sourceforge.net/pub/sourceforge/l/la/labrea/OldFiles/LaBrea-Tom-Liston-Whitepaper-Welcome-to-my-tarpit.txt.

Locasto, M.E. et al., "Application Communities: Using Monoculture for Dependability", In Proceedings of the 1st Workshop on Hot Topics in System Dependability (HotDep '05), Yokohama, JP, Jun. 30, 2005, pp. 1-5.

Mahoney, M. et al., "Detecting Novel Attacks by Identifying Anomalous Network Packet Headers", Technical Report, Florida Institute of Technology, Oct. 2001, pp. 1-10.

Mahoney, M.V. and Chan, P.K., "An Analysis of the 1999 DARPA/Lincoln Laboratory Evaluation Data for Network Anomaly Detection", In Proceedings of the 6th International Symposium Recent Advances in Intrusion Detection, Pittsburgh, PA, US, Sep. 8-10, 2003, pp. 220-237.

(56) References Cited

OTHER PUBLICATIONS

Mahoney, M.V. and Chan, P.K., "Learning Nonstationary Models of Normal Network Traffic for Detecting Novel Attacks", In Proc. of the 8th Assoc. Computing Machinery Int. Conf. on Knowledge Discovery and Data Mining (KDD '02), Edmonton, AB, CA, Jul. 23-26, 2002, pp. 376-385.
Mahoney, M.V., "Network Traffic Anomaly Detection Based on Packet Bytes", In Proceedings of the 2003 ACM Symposium on Applied Computing (SAC '03), Melbourne, FL, US, Mar. 9-12, 2003, pp. 346-350.
Malton, A., "The Denotational Semantics of a Functional Tree-Manipulation Language", In Computer Languages, vol. 19, No. 3, Jul. 1993, pp. 157-168.
McAfee, "Homepage—macafee.com", Online publication, last accessed Jun. 17, 2016, pp. 1-2, available at: http://www.mcafee.com.
Microsoft Corporation, "Microsoft Portable Executable and Common Object File Format Specification", Technical Report, Revision 6.0, Feb. 1999, pp. 1-77.
Microsoft, "Structure of the Registry", last accessed Jan. 29, 2016, pp. 1-2, available at: http://msdn.microsoft.com/enus/library/windows/desktop/ms724946(v=vs.85).aspx.
Miller, T. et al., "Strlcpy and Strlcal-Consistent, Safe, String Copy and Concatenation", In Proceedings of the FREENIX Track: 1999 USENIX Annual Technical Conference, Monterey, CA, US, Jun. 6-11, 1999, pp. 131-144.
Moore, D. et al., "Code-Red: A Case Study on the Spread and Victims of an Internet Worm", In Proceedings of the 2nd Internet Measurement Workshop (IMW '02), Marseille, FR, Nov. 6-8, 2002, pp. 273-284.
Moore, D. et al., "Internet Quarantine: Requirements for Containing Self-Propagating Code", In IEEE Societies Twenty-Second Annual Joint Conference of the IEEE Computerand Communications, vol. 3, Mar. 30-Apr. 3, 2003, pp. 1901-1910.
Moore, D., "The Spread of the Sapphire/Slammer Worm", last updated Apr. 3, 2003, pp. 1-7, available at: http://www.silicondefense.com/research/worms/slammer.php.
Mosberger, D. et al., "httperf—A Tool for Measuring Web Server Performance", In Association for Computing Machinery's Special Interest Group on Measurement and Evaluation Performance Evaluation Review, vol. 26, No. 3, Dec. 1998, pp. 31-37.
Mukkamala, S., excerpts from "Intrusion Detection using an Ensemble of Intelligent Paradigms", In the Journal of Network and Computer Applications, vol. 28, No. 2, Apr. 2005, pp. 167-182.
Murray, J.D., "Windows NT Event Logging, Chapter 4: Windows NT Security Auditing", 1st Edition, O'Reilly Media, Sep. 1998, pp. 64-97.
Nachenberg, C., "Behavior Blocking: The Next Step in Anti-Virus Protection", last updated Mar. 19, 2002, pp. 1-7, available at: http://www.symantec.com/connect/articles/behavior-blocking-next-step-anti-virus-protection.
Nachenberg, C., "Computer Virus - Coevolution", In Communications of the Asssociation for Computing Machinery, vol. 40, No. 1, Jan. 1997, pp. 46-51.
Nethercote, N. et al., "Valgrind: A Program Supervision Framework", In Electronic Notes in Theoretical Computer Science, vol. 89, No. 2, Oct. 2003, pp. 44-66.
Newsome, J. and Song, D., "Dynamic Taint Analysis for Automatic Detection, Analysis, and Signature Generation of Exploits on Commodity Software", In Proceedings of the 12th Annual Network and Distributed System Security Symposium (NDSS '05), San Diego, CA, US, Feb. 3-4, 2005, pp. 1-17.
Nojiri, D. et al., "Cooperative Response Strategies for Large Scale Attack Mitigation", In Proceedings of the 3rd Defense Advanced Research Projects Agency Information Survivability Conference and Exposition, Washington, DC, US, Apr. 22-24, 2003, pp. 293-302.
Notice of Allowance dated Mar. 15, 2013 in U.S. Appl. No. 13/397,670, pp. 1-48.
Notice of Allowance dated May 9, 2019 in U.S. Appl. No. 15/247,154, pp. 1-19.
Notice of Allowance dated May 19, 2016 in U.S. Appl. No. 14/185,175, pp. 1-60.
Notice of Allowance dated Jul. 28, 2011 in U.S. Appl. No. 12/091,150, pp. 1-34.
Notice of Allowance dated Nov. 1, 2011 in U.S. Appl. No. 12/447,946, pp. 1-35.
Notice of Allowance dated Nov. 8, 2013 in U.S. Appl. No. 13/301,741, pp. 1-5.
Notice of Allowance dated Nov. 27, 2013 in U.S. Appl. No. 13/942,632. pp. 1-60.
NT Security, "Trojan/XTCP", Panda Software's Center for Virus Control, Jun. 22, 2002, pp. 1-3, available at: http://www.ntsecurity.net/Panda/Index.cfm?FuseAction=Virus&VirusID=659.
NW Internet, "Setup Trojan", last updated Mar. 6, 2005, p. 1, available at: http://www.nwinternet.com/~pchelp/bo/setuptrojan.txt.
Office Action dated Jan. 23, 2018 in U.S. Appl. No. 15/247,154, pp. 2-53.
Office Action dated Feb. 5, 2016 in U.S. Appl. No. 14/185,175, pp. 2-11.
Office Action dated Mar. 3, 2011 in U.S. Appl. No. 12/447,946, pp. 2-31.
Office Action dated Jun. 10, 2015 in U.S. Appl. No. 14/014,871, pp. 2-50.
Office Action dated Jun. 26, 2015 in U.S. Appl. No. 14/185,175, pp. 2-14.
Office Action dated Aug. 14, 2012 in U.S. Appl. No. 13/397,670, pp. 2-36.
Office Action dated Aug. 23, 2010 in U.S. Appl. No. 12/091,150, pp. 2-41.
Office Action dated Aug. 24, 2017 in U.S. Appl. No. 14/014,871, pp. 2-75.
Office Action dated Aug. 24, 2017 in U.S. Appl. No. 15/014,784, pp. 2-34.
Office Action dated Sep. 7, 2012 in U.S. Appl. No. 13/301,741, pp. 2-19.
Office Action dated Sep. 18, 2020 in U.S. Appl. No. 16/175,424, pp. 2-38.
Office Action dated Sep. 29, 2014 in U.S. Appl. No. 14/014,871, pp. 2-14.
Office Action dated Oct. 3, 2018 in U.S. Appl. No. 15/247,154, pp. 2-19.
Office Action dated Oct. 7, 2016 in U.S. Appl. No. 15/014,784, pp. 2-49.
Office Action dated Nov. 15, 2019 in U.S. Appl. No. 16/175,429, pp. 2-34.
Office Action dated Dec. 16, 2016 in U.S. Appl. No. 14/014,871, pp. 2-63.
Oplinger, J. et al., "Enhancing Software Reliability with Speculative Threads", In Proceedings of the 10th International Conference on Architectural Support for Programming Languages and Operating Systems, San Jose, CA, US, Oct. 5-9, 2002, pp. 184-196.
Paxson, V., "Bro: A System for Detecting Network Intruders in Real-Time", In Proceedings of the 7th USENIX Security Symposium, San Antonio, TX, US, Jan. 26-29, 1998, pp. 1-18.
Peterson, D.S. et al., "A Flexible Containment Mechanism for Executing Untrusted Code", In Proceedings of the 11th USENIX Security Symposium (SSYM '02), San Francisco, CA, US, Aug. 5-9, 2002, pp. 207-225.
Porras, P.A. and Neumann, P.G., "Emerald: Event Monitoring Enabling Responses to Anomalous Live Disturbances", In Proceedings of the 20th National Information Systems Security Conference, Baltimore, MD, US, Oct. 7-10, 1997, pp. 353-365.
Prasad, M. et al., "A Binary Rewriting Defense Against Stack Based Buffer Overflow Attacks", In Proceedings of the USENIX Annual Technical Conference, Boston, MA, US, Jun. 9-14, 2003, pp. 211-224.
Prevelakis, V. and Spinellis, D., "Sandboxing Applications", In Proceedings of the USENIX Annual Technical Conference (ATEC '01), Boston, MA, US, Jun. 25-30, 2001, pp. 119-126.
Prevelakis, V., "A Secure Station for Network Monitoring and Control", In Proceedings of the 8th USENIX Security Symposium (SSYM '99), Washington, DC US, Aug. 23-26, 1999, pp. 1-8.

(56) References Cited

OTHER PUBLICATIONS

Provos, N. et al., "Preventing Privilege Escalation", In Proceedings of the 12th Conference on USENIX Security Symposium (SSYM'03), Washington, DC, US, Aug. 4-8, 2003, pp. 1-11.

Provos, N., "Improving Host Security with System Call Policies", In Proceedings of the 12th USENIX Security Symposium (SSYM '03), Washington, DC, US, Aug. 4-8, 2003, pp. 257-272.

Quinlan, J.R., "Bagging, Boosting and C4.5", In Proceedings of the Thirteenth National Conference on Artificial Intelligence, Portland, OR, US, Aug. 4-8, 1996, pp. 725-730.

Ramakrishnan, C.R., "Model-Based Vulnerability Analysis of Computer Systems", In Proceedings on the 2nd International Workshop on Verification Model Checking and Abstract Interpretation, Pisa, IT, Sep. 19, 1998, pp. 1-8.

Red Hat, "Configuring OpenSSH", Red Hat Enterprise Linux, accessed Aug. 15, 2014, pp. 1-6, available at: https://access.redhat.com/documentation/en-US/Red_Hat_Enterprise_Linux/7/html/System_Administrators_Guide/s1-ssh-configuration.html.

Reynolds, J. et al., "Online Intrusion Protection by Detecting Attacks with Diversity", In Proceedings of the 16th International Conference on Data and Applications Security, Cambridge, GB, Jul. 28-31, 2002, pp. 245-256.

Reynolds, J. et al., "The Design and Implementation of an Intrusion Tolerant System", In Proceedings of the International Conference on Dependable Systems and Networks, Bethesda, MD, US, Jun. 23-26, 2002, pp. 285-292.

Riley, M. et al., "Missed Alarms and 40 Million Stolen Credit Card Numbers: How Target Blew It", In Bloomberg Businessweek, Mar. 13, 2014, pp. 1-10, available at: http://www.businessweek.com/articles/2014-03-13/target-missedalarms-in-epic-hack-of-credit-card-data.

Rinard, M. et el., "A Dynamic Technique for Eliminating Buffer Overflow Vulnerabilities (and Other Memory Errors)", In Proceedings 20th Annual Computer Security Applications Conference (ACSAC '04), Tucson, AZ, US, Dec. 6-10, 2004, pp. 82-90.

Rinard, M. et al., "Enhancing Server Availability and Security Through Failure-Oblivious Computing", In Proceedings of the 6th Symposium on Operating Systems Design and Implementation, San Francisco, CA, US, Dec. 6-8, 2004, pp. 303-316.

Robichaux, P., "Managing the Windows NT Registry, Chapter 8: Administering the Windows NT Registry" 1st Edition, O'Reilly Media, Newton, MA, Apr. 1998, pp. 231-272.

Roesch, M., "Snort: Lightweight Intrusion Detection for Networks", In Proceedings of the 13th Conference on Systems Administration, Seattle, WA, US, Nov. 7-12, 1999, pp. 229-238.

Rosenblum, M. et al., "Using the SimOS Machine Simulator to Study Complex Computer Systems", In Association for Computing Machinery Transactions on Modeling and Computer Simulation, vol. 7, No. 1, Jan. 1997, pp. 78-103.

Rudys, A. and Wallach, D.S., "Transactional Rollback for Language-Based Systems", In Proceedings of the International Conference on Dependable Systems and Networks (DSN '02), Bethesda, MD, US, Jun. 23-26, 2002, pp. 439-448.

Rudys, A. et al., "Termination in Language-Based Systems", In Association for Computing Machinery Transactions on Information and System Security, vol. 5, No. 2, May 2002, pp. 138-168.

Russinovich, M. and Cogswell, B., "Filemon for Windows NT/9x", last updated Aug. 14, 2000, pp. 1-3, available at: https://web.archive.org/web/20000815094424/http://www.sysinternals.com/filemon.htm.

Russinovich, M. and Cogswell, B., "Regmon for Windows NT/9x", last updated Nov. 1, 2006, pp. 1-4. available at: https://web.archive/org/web/20000308184259/http://www.sysinternals.com/ntw2k/source/regmon.shtm.

Scholkopf, B. et al., "Estimating the Support of a High-Dimensional Distribution", Technical Report, Microsoft Research, Sep. 18, 2000, pp. 1-31.

Schonlau, M. and Theus, M., "Detecting Masquerades in Intrusion Detection Based on Unpopular Commands", In Information Processing Letters, vol. 76, No. 1-2, Nov. 2000, pp. 33-38.

Schonlau, M. et al., "Computer Intrusion: Detecting Masquerades", In Statistical Science, vol. 16, No. 1, Feb. 2001, pp. 58-74.

Schultz, M. et al., "MEF: Malicious Email Filter—A Unix Mail Filter that Detects Malicious Windows Executables", In Proceedings of the FREENIX Track: 2001 USENIX Annual Technical Conference, Boston, MA, US, Jun. 25-30, 2001, pp. 245-252.

Schultz, M.G. et al., "Data Mining Methods for Detection of New Malicious Executables", In Proceedings of the IEEE Symposium on Security and Privacy (S&P '01), Oakland, CA, US, May 14-16, 2001, pp. 38-49.

Schwartzbard, A. and Ghosh, A.K., "Study in the Feasibility of Performing Host-based Anomaly Detection on Windows NT", In Proceedings of the 2nd International Workshop on Recent Advances in Intrusion Detection, West Lafayette, IN, US, Sep. 7-9, 1999, pp. 1-10.

Security Space, "Web Server Survey", last updated May 1, 2003, p. 1, available at: http://www.securityspace.com/s_survey/data/200304/.

Sekar, R. et al. "Specification-Based Anomaly Detection: A New Approach for Detecting Network Intrusions", In Proceedings of the 9th ACM Conference on Computer and Communications Security (CCS '02), Washington, DC, US, Nov. 18-22, 2002, pp. 265-274.

Sekar, R. et al., "A Fast Automaton-Based Method for Detecting Anomalous Program Behaviors", In Proceedings of the IEEE Symposium on Security & Privacy (S&P '01), Oakland, CA, US, May 14-16, 2001, pp. 144-155.

Sekar, R. et al., "Model-Carrying Code: A Practical Approach for Safe Execution of Untrusted Applications", In Proceedings of the 19th Assosciation for Computing Machinery Symposium on Operating Systems Principles, Bolton Landing, NY, US, Oct. 19-22, 2003, pp. 15-28.

Seward, J. and Nethercote, N., "Valgrind, An Open-Source Memory Debugger for x86-GNU/Linux", Developer.Kde, May 5, 2003, pp. 1-6, available at: http://developer.kde.org/~sewardj/.

Shacham, H. et al., "On the Effectiveness of Address-Space Randomization", In Proceedings of the 11th ACM Conference on Computer and Communications Security (CCS '04), Washington, DC, US, Oct. 25-29, 2004, pp. 298-307.

Shavlik, J. et al., "Evaluating Software Sensors for Actively Profiling Windows 2000 Computer Users", In Proceedings of the 4th International Symposium on Recent Advances in Intrusion Detection (RAID '01), Davis, CA, US, Oct. 10-12, 2001, pp. 1-17.

Shoch, J. et al., "The 'Worm' Programs—Early Experiments with a Distributed Computation", In Communications of the Asssociation for Computing Machinery, vol. 22, No. 3, Mar. 1982, pp. 172-180.

Sidiroglou, S. and Keromytis, A.D., "A Network Worm Vaccine Architecture", In Proceedings of the Twelfth IEEE International Workshops on Enabling Technologies: Infrastructure for Collaborative Enterprises (WETICE '03), Workshop on Enterprise Security, Linz, AT, Jun. 9-11, 2003, pp. 220-225.

Sidiroglou, S. et al., "Building a Reactive Immune System for Software Services", In Proceedings of the 2005 USENIX Annual Technical Conference (USENIX '05), Anaheim, CA, US, Apr. 10-15, 2005, pp. 149-161.

Sidiroglou, S., and Keromytis, A.D., "Using Execution Transactions to Recover from Buffer Overflow Attacks", Technical Report, 2004, pp. 1-16.

Smaha, S.E., "Haystack: An Intrusion Detection System", In the Fourth Aerospace Computer Security Applications Conference (IEEE Cat. No. CH2619-5 '88), Orlando, FL, US, Dec. 12-16, 1988, pp. 37-44.

Smirnov, A. and Chiueh, T., "DIRA: Automatic Detection, Identification, and Repair of Control-Hijacking Attacks", In Proceedings of the 12th Symposium on Network and Distributed System Security (NDSS '05), San Diego, CA, US, Feb. 3-4, 2005, pp. 1-17.

Somayaji, A. et al., "Principles of a Computer Immune System", In Proceedings of the New Security Paradigms Workshop, Langdale, UK, Sep. 23-26, 1997, pp. 75-82.

Somayaji, A.B., "Operating System Stability and Security through Process Homeostasis", Dissertation, Massachusetts Institute of Technology, Jul. 2002, pp. 1-198.

Song, D. et al., "A Snapshot of Global Internet Worm Activity", Technical Report, Arbor Networks, Nov. 2001, pp. 1-8.

(56) References Cited

OTHER PUBLICATIONS

Soni, S., "Understanding Linux Configuration Files", Technical Report, IBM developerWorks, Dec. 1, 2001, pp. 1-11, available at: http://www.ibm.com/developerworks/library/l-config/.

Sourceware, "Summary of GDB", last accessed Aug. 28, 2014, p. 1, available at: https://sourceware.org/gdb/current/onlinedocs/gdb/Summary.html#Summary.

Spafford, E., "The Internet Worm Program: An Analysis", Technical Report, CSD-TR-823, Purdue University, Dec. 1988, pp. 1-40.

Stamp, M., "Risks of Monoculture", In Communications of the Assosciation for Computing Machinery, vol. 47, No. 3, Mar. 2004, p. 120.

Staniford, S. et al., "How to Own the Internet in Your Spare Time", In Proceedings of the 11th USENIX Security Symposium, San Francisco, CA, US, Aug. 5-9, 2002, pp. 149-167.

Street, W.N., "A Streaming Ensemble Algorithm (SEA) for Large-Scale Classification", In Proceedings of the Seventh ACM SIGKDD International Conference on Knowledge Discovery and Data Mining, San Francisco, CA, US, Aug. 26-29, 2001, pp. 377-382.

Sugerman, J. et al., "Virtualizing I/O Devices on VMware Workstation's Hosted Virtual Machine Monitor", In Proceedings of the 2001 USENIX Annual Technical Conference, Boston, MA, US, Jun. 25-30, 2001, pp. 1-14.

Suh, G.E. et al., "Secure Program Execution via Dynamic Information Flow Tracking", In Proceedings of the 11th International Conference on Architectural Support for Programming Languages and Operating Systems (ASPLOS '04) Boston, MA, US, Oct. 7-13, 2004, pp. 85-96.

Sun, "SunSHIELD Basic Security Module Guide", Sun Microsystems, Inc., 1995, pp. 1-196.

Sun, "SunSHIELD Basic Security Module Guide", Sun Microsystems, Inc., 2000, pp. 1-239.

Symantec, "Happy99.Worm", Symantec.com, last updated Feb. 13, 2007, pp. 1-9, available at: http://www.symantec.com/qvcenter/venc/data/happy99.worm.html.

Symantec, "The Digital Immune System: Enterprise-Grade Anti-Virus Automation in the 21st Century", Technical Brief, Symantec, 2001, pp. 1-16.

Szor, P., "The Art of Computer Virus Research and Defense", Addison-Wesley Professional, Feb. 13, 2005, pp. 1-617.

Tandon, G., "Learning Rules From System Call Arguments And Sequences For Anomaly Detection", In Proceedings of ICDM Workshop on Data Mining for Computer Security (DMSEC '03), Melbourne, FL, US, Nov. 19, 2003, pp. 20-29.

Taylor, C. and Alves-Foss, J., "NATE-Network Analysis of Anomalous Traffic Events, A Low-Cost Approach", In New Security Paradigms Workshop (NSPW '01), Cloudcroft, NM, US, Sep. 10-13, 2002, pp. 89-96.

Teng, H.S et al., "Adaptive Real-Time Anomaly Detection Using Inductively Generated Sequential Patterns", In Proceedings of the IEEE Symposium on Security and Privacy (S&P '90), Oakland, CA, US, May 7-9, 1990, pp. 278-284.

Toth, T. and Kruegel, C., "Connection-History Based Anomaly Detection", In Proceedings of the 2002 IEEE Workshop on Information Assurance and Security (IAS '02), West Point, NY, US, Jun. 17-19, 2002, pp. 30-35.

Toth, T. et al., "Accurate Buffer Overflow Detection via Abstract Payload Execution", In Proceedings of the 5th Symposium on Recent Advances in Intrusion Detection, Zurich, CH, Oct. 16-18, 2002, pp. 274-291.

Toyoizumi, H. et al., "Predators: Good Will Mobile Codes Combat Against Computer Viruses", In Proceedings of the 2002 Workshop on New Security Paradigms, Virginia Beach, VA, US, Sep. 23-26, 2002, pp. 11-17.

Tripwire, "Tripwire Intrusion Detection System 1.3 for LINUX User Manual", Jul. 27, 1998, pp. 1-46.

Tripwire, Inc. "Tripwire 2.4 Reference Guide", 2001, pp. 1-140.

Tripwire, Inc. "Tripwire for Servers 2.4 User Guide", 2001, pp. 1-118.

Tsymbal, A., "The Problem of Concept Drift: Definitions and Related Work", Technical Report TCD-CS-2004-15, Department of Computer Science, Trinity College Dublin, IE, Apr. 2004, pp. 1-7.

Twycross, T. et al., "Implementing and Testing a Virus Throttle", In Proceedings of the 12th USENIX Security Symposium, Washington, DC, US, Aug. 4-8, 2003, pp. 285-294.

U.S. Appl. No. 60/308,623, filed Jul. 30, 2001, pp. 1-18.

U.S. Appl. No. 60/351,857, filed Jan. 25, 2002, pp. 1-21.

U.S. Appl. No. 60/730,289, filed Oct. 25, 2005, pp. 1-227.

Valcare, E.M. et al., excerpts from "ESSENCE: An Experiment in Knowledge-Based Security Monitoring and Control", In USENIX Security Symposium III Proceedings, Baltimore, MD, US, Sep. 1992, pp. 155-169.

Vendicator, "Stack Shield: A 'Stack Smashing' Technique Protection Tool for Linux", Jan. 7, 2000, p. 1, available at: http://angelfire.com/sk/stackshield.

Vigna, G. and Kemmerer, R.A., "NetSTAT: A Network-Based Intrusion Detection System", In Journal of Computer Security, vol. 7, No. 1, Sep. 1999, pp. 37-71.

Viljanen, L., "A Survey of Application Level Intrusion Detection", Technical Report, University of Helsinki, FI, Dec. 2004, pp. 1-32.

Wang, C. et al., "On Computer Viral Infection and the Effect of Immunization", In Proceedings of the 16th Annual Computer Security Applications Conference (ACSAC '00), New Orleans, LA, US, Dec. 11-15, 2000, pp. 246-256.

Wang, N. et al., "Y-Branches: When You Come to a Fork in the Road, Take It", In Proceedings of the 12th International Conference on Parallel Architectures and Compilation Techniques (PACT '03), New Orleans, LA, US, Sep. 27-Oct. 1, 2003, pp. 56-66.

Warrender, C. et al., "Detecting Intrusions Using System Calls: Alternative Data Models", In IEEE Symposium on Security and Privacy (S&P '99), Oakland, CA, US, May 9-12, 1999, pp. 133-145.

Webb, A.R., excerpts from "Statistical Pattern Recognition", Oxford University Press, 1999, p. 347.

Whitaker, A. et al., "Scale and Performance in the Denali Isolation Kernel", In Proceedings of the Fifth Symposium on Operating Systems Design and Implementation (OSDI '02), Boston, MA, US, Dec. 9-11, 2002, pp. 195-209.

White, S.R., "Anatomy of a Commercial-Grade Immune System", In Proceedings of the Ninth International Virus Bulletin Conference, Vancouver, BC, Ca, Sep. 30, 1999, pp. 1-28.

White, S.R.,"Open Problems in Computer Virus Research", Technical Report, IBM Thomas J. Watson Research Center, Oct. 1998, pp. 1-10, available at: http://www.research.ibm.com/antivirus/SciPapers/White/Problems/Problems.html.

Whittaker, J., "No Clear Answers on Monoculture Issues", In IEEE Security & Privacy, vol. 1, No. 6, Nov. 2003, pp. 18-19.

Wilander, J. et al., "A Comparison of Publicly Available Tools for Dynamic Buffer Overflow Prevention", In Proceedings of the 10th Network and Distributed System Security Symposium, San Diego, CA, US, Feb. 6-7, 2003, pp. 1-14.

Williamson, M., "Throttling Viruses: Restricting Propagation to Defeat Malicious Mobile Code", Technical Report, HP Laboratories Bristol, Dec. 2002, pp. 1-9.

Witten, I.H. and Frank, E., "Data Mining: Practical Machine Learning Tools and Techniques with Java Implementations", 2000, pp. 1-369.

Ye, N., "A Markov Chain Model of Temporal Behavior for Anomaly Detection", In Proceedings of the IEEE Workshop on Information Assurance and Security (IAS '00), West Point, NY, US, Jun. 6-7, 2000, pp. 171-174.

Yeung, D.Y. and Ding, Y., "Host-Based Intrusion Detection using Dynamic and Static Behavioral Models", In Pattern Recognition, vol. 36, No. 1, Nov. 22, 2001, pp. 229-243.

Yin, J. et al., "Separating Agreement from Execution for Byzantine Fault Tolerant Services", In Proceedings of the 19th Assosciation for Computing Machinery Symposium on Operating Systems Principles, Bolton Landing, NY, US, Oct. 19-22, 2003, pp. 253-267.

Zou, C. et al., "Code Red Worm Propagation Modeling and Analysis", In Proceedings of the 9th ACM Conference on Computer and Communications Security, Washington, DC, US, Nov. 18-22, 2002, pp. 138-147.

(56) References Cited

OTHER PUBLICATIONS

Zou, C.C. et al., "Monitoring and Early Warning for Internet Worms", In Proceedings of the 10th ACM International Conference on Computer and Communications Security (CCS '03), Washington, DC, US, Oct. 27-30, 2003, pp. 190-199.

Zweinenberg, R., excerpts from "Heuristics Scanners: Artificial Intelligence", In Proceedings of Virus Bulletin Conference, Boston, MA, US, Sep. 20-22, 1995, pp. 205-209.

\* cited by examiner

500

```
void foo() {
    int a = 1;
    emulate_init();
    emulate_begin(p_args);
    a++;
    emulate_end();
    emulate_term();
    printf("a = %d\n", a);
}
```

| $f_i$ | $x_i$ | $r_i$ | $v_i$ | $T$ | $C(f_i, x_i)$ | $r_i * v_i$ |
|---|---|---|---|---|---|---|
| a() | 100 | 1 | $a_1$ | 600 | 16 | $a_1$ |
| b() | 200 | 2 | $a_2$ | 600 | 33 | $2a_2$ |
| c() | 300 | 3 | $a_3$ | 600 | 50 | $3a_3$ |

FIG. 7

METHODS, MEDIA, AND SYSTEMS FOR DETECTING AN ANOMALOUS SEQUENCE OF FUNCTION CALLS

CROSS REFERENCE TO RELATED APPLICATIONS

This application is continuation of U.S. patent application Ser. No. 15/247,154, filed Aug. 25, 2016, which is a continuation of U.S. patent application Ser. No. 14/185,175, filed Feb. 20, 2014, which is a continuation of U.S. patent application Ser. No. 13/942,632, filed, Jul. 15, 2013, which is a continuation of U.S. patent application Ser. No. 13/397,670, filed Feb. 15, 2012, which is a continuation of U.S. patent application Ser. No. 12/447,946, filed Mar. 2, 2010, which is the U.S. National Phase Application under 35 U.S.C. § 371 of International Patent Application No. PCT/US2007/083003, filed Oct. 30, 2007, which claims the benefit of U.S. Provisional Patent Application No. 60/855,704 filed Oct. 30, 2006 and U.S. Provisional Patent Application No. 60/856,669 filed Nov. 3, 2006, each of which is hereby incorporated by reference herein in its entirety.

TECHNOLOGY AREA

The disclosed subject matter relates to methods, media, and systems for detecting an anomalous sequence of function calls.

BACKGROUND

Applications may terminate due to any number of threats, program errors, software faults, attacks, or any other suitable software failure. Computer viruses, worms, trojans, hackers, key recovery attacks, malicious executables, probes, etc. are a constant menace to users of computers connected to public computer networks (such as the Internet) and/or private networks (such as corporate computer networks). In response to these threats, many computers are protected by antivirus software and firewalls. However, these preventative measures are not always adequate. For example, many services must maintain a high availability when faced by remote attacks, high-volume events (such as fast-spreading worms like Slammer and Blaster), or simple application-level denial of service (DoS) attacks.

Aside from these threats, applications generally contain errors during operation, which typically result from programmer error. Regardless of whether an application is attacked by one of the above-mentioned threats or contains errors during operation, these software faults and failures result in illegal memory access errors, division by zero errors, buffer overflows attacks, etc. These errors cause an application to terminate its execution or "crash."

SUMMARY

Methods, media, and systems for detecting an anomalous sequence of function calls are provided. In some embodiments, methods for detecting an anomalous sequence of function calls is provided. The methods including compressing a sequence of function calls made by the execution of a program using a compression model; and determining the presence of an anomalous sequence of function calls in the sequence of function calls based on the extent to which the sequence of function calls is compressed. In some embodiments, the methods further include executing at least one known program; observing at least one sequence of function calls made by the execution of the at least one known program; assigning each type of function call in the at least one sequence of function calls made by the at least one known program a unique identifier; and creating at least part of the compression model by recording at least one sequence of unique identifiers based on the unique identifiers assigned to each type of function call and the observed at least one sequence of function calls.

In some embodiments, computer-readable media containing computer-executable instructions that, when executed by a processor, cause the processor to perform a method for detecting an anomalous sequence of function calls are provided. The methods including compressing a sequence of function calls made by the execution of a program using a compression model; and determining the presence of an anomalous sequence of function calls in the sequence of function calls based on the extent to which the sequence of function calls is compressed. In some embodiments, the methods further include executing at least one known program; observing at least one sequence of function calls made by the execution of the at least one known program; assigning each type of function call in the at least one sequence of function calls made by the at least one known program a unique identifier; and creating at least part of the compression model by recording at least one sequence of unique identifiers based on the unique identifiers assigned to each type of function call and the observed at least one sequence of function calls.

In some embodiments, systems for detecting an anomalous sequence of function calls including a memory; and a processor in communication with the memory are provided. Wherein the processor compresses a sequence of function calls made by the execution of a program using a compression model; and determines the presence of an anomalous sequence of function calls in the sequence of function calls based on the extent to which the sequence of function calls is compressed. In the some embodiments, the processor further executes at least one known program; observes at least one sequence of function calls made by the execution of the at least one known program; assigns each type of function call in the at least one sequence of function calls made by the at least one known program a unique identifier; and creates at least part of the compression model by recording at least one sequence of unique identifiers based on the unique identifiers assigned to each type of function call and the observed at least one sequence of function calls.

BRIEF DESCRIPTION OF THE DRAWINGS

FIG. 5 shows an illustrative example of emulated code integrated into the code of an existing application in accordance with some embodiments;

FIG. 7 shows an illustrative example of a table that may be calculated by a member of the application community for distributed bidding in accordance with some embodiments of the disclosed subject matter.

DETAILED DESCRIPTION

Methods, media, and systems for detecting an anomalous sequence of function calls and/or detecting anomalous program executions are provided. In some embodiments, systems and methods are provided that model application level computations and running programs, and that detect anomalous executions by, for example, instrumenting, monitoring and analyzing application-level program function calls and/ or arguments. Such an approach can be used to detect anomalous program executions that may be indicative of a malicious attack or program fault.

The anomaly detection algorithm being used may be, for example, a probabilistic anomaly detection (PAD) algorithm or a one class support vector machine (OCSVM), which are described below, or any other suitable algorithm.

Anomaly detection may be applied to process execution anomaly detection, file system access anomaly detection, and/or network packet header anomaly detection. Moreover, as described herein, according to various embodiments, an anomaly detector may be applied to program execution state information. For example, as explained in greater detail below, an anomaly detector may model information on the program stack to detect anomalous program behavior.

In various embodiments, using PAD to model program stack information, such stack information may be extracted using, for example, Selective Transactional EMulation (STEM), which is described below and which permits the selective execution of certain parts, or all, of a program inside an instruction-level emulator, using the Valgrind emulator, by modifying a program's binary or source code to include indicators of what functions calls are being made (and any other suitable related information), or using any other suitable technique. In this manner, it is possible to determine dynamically (and transparently to the monitored program) the necessary information such as stack frames, function-call arguments, etc. For example, one or more of the following may be extracted from the program stack specific information: function name, the argument buffer name it may reference, and other features associated with the data sent to or returned from the called function (e.g., the length in bytes of the data, or the memory location of the data).

Figure 8:
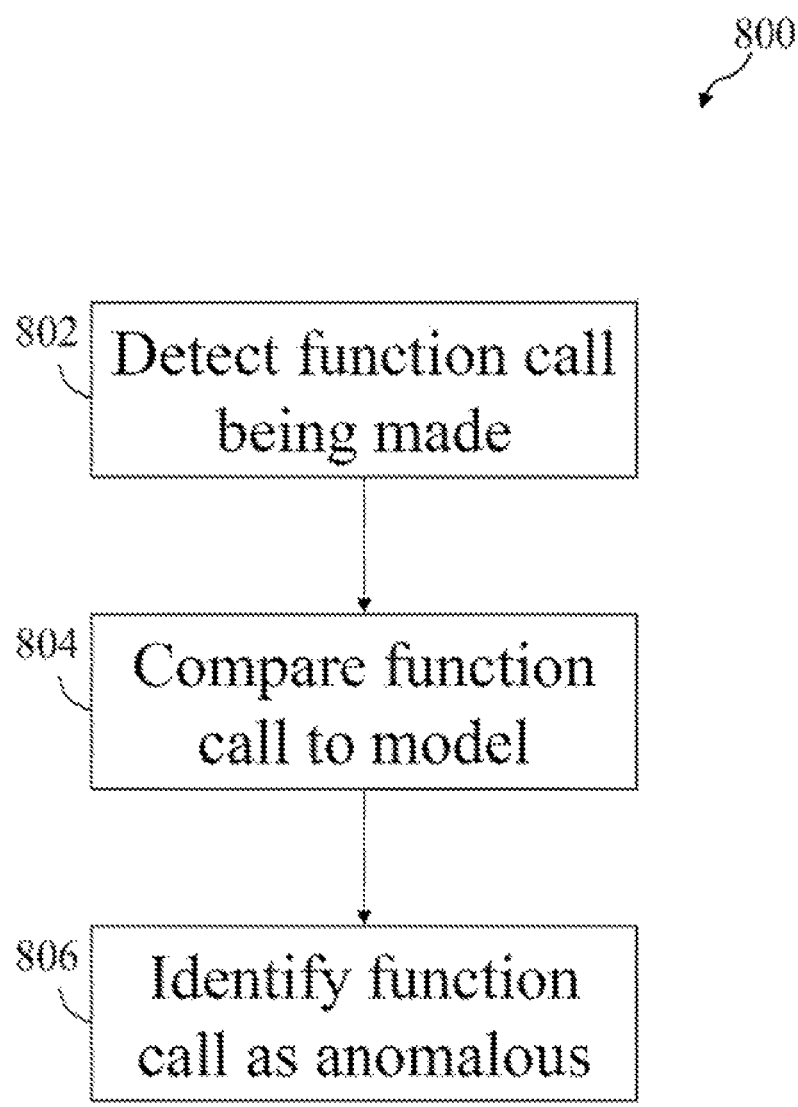
FIG. 8 shows a simplified diagram illustrating shows identifying a function call as being anomalous in accordance with some embodiments.

For example, as illustrated in FIG. 8, an anomaly detector may be applied, for example, by extracting data pushed onto the stack (e.g., by using an emulator or by modifying a program), and creating a data record provided to the anomaly detector for processing at 802. According to various embodiments, in a first phase, an anomaly detector models normal program execution stack behavior. In the detection mode, after a model has been computed, the anomaly detector can detect stacked function references as anomalous at 806 by comparing those references to the model based on the training data at 804.

Once an anomaly is detected, according to various embodiments, selective transactional emulation (STEM) and error virtualization may be used to reverse (undo) the effects of processing the malicious input (e.g., changes to program variables or the file system) in order to allow the program to recover execution in a graceful manner. In this manner, the precise location of the failed (or attacked) program at which an anomaly was found may be identified. Also, the application of an anomaly detector to function calls can enable rapid detection of malicious program executions, such that it is possible to mitigate against such faults or attacks (e.g., by using patch generation systems, or content filtering signature generation systems). Moreover, given precise identification of a vulnerable location, the performance impact may be reduced by using STEM for parts or all of a program's execution.

As explained above, anomaly detection can involve the use of detection models. These models can be used in connection with automatic and unsupervised learning.

In some embodiments, such models can be created from a training set of function calls and optionally at least some of their arguments. For example, a model can include a compressed series of function calls observed by execution of a training set of known non-anomalous applications. Various compression techniques can be used in various embodiments. For example, in some embodiments, a compression model can be used as a dictionary in a compression technique, such as Lempel-Ziv-Welch (LZW) compression. More particularly, for example, if each function call is assigned an identifier (e.g., a two digit number, a string, a code, etc.), a sequence of function calls can appear as a series of identifiers. Different series of identifiers in a training set can then be used to form a library or table of sequences which can be part of a compression model. A determination can then be made as to whether a sequence of function calls is anomalous based upon how well they can be compressed using a compression model (e.g., a dictionary, a library, a table of sequences) derived from the training set. If a stream of function calls can be compressed well using a model (e.g., created from known non-anomalous applications), then training and test sets have similar function calls and the function calls can be considered non-anomalous. However, if the test set cannot be compressed well, then the test set may contain anomalous function calls. The determination of the extent to which test data needs to be compressed in order to be found to be non-anomalous can be performed using various techniques, such as, for example, techniques based on empirical data and/or user and/or administrator settings.

Figure 9:
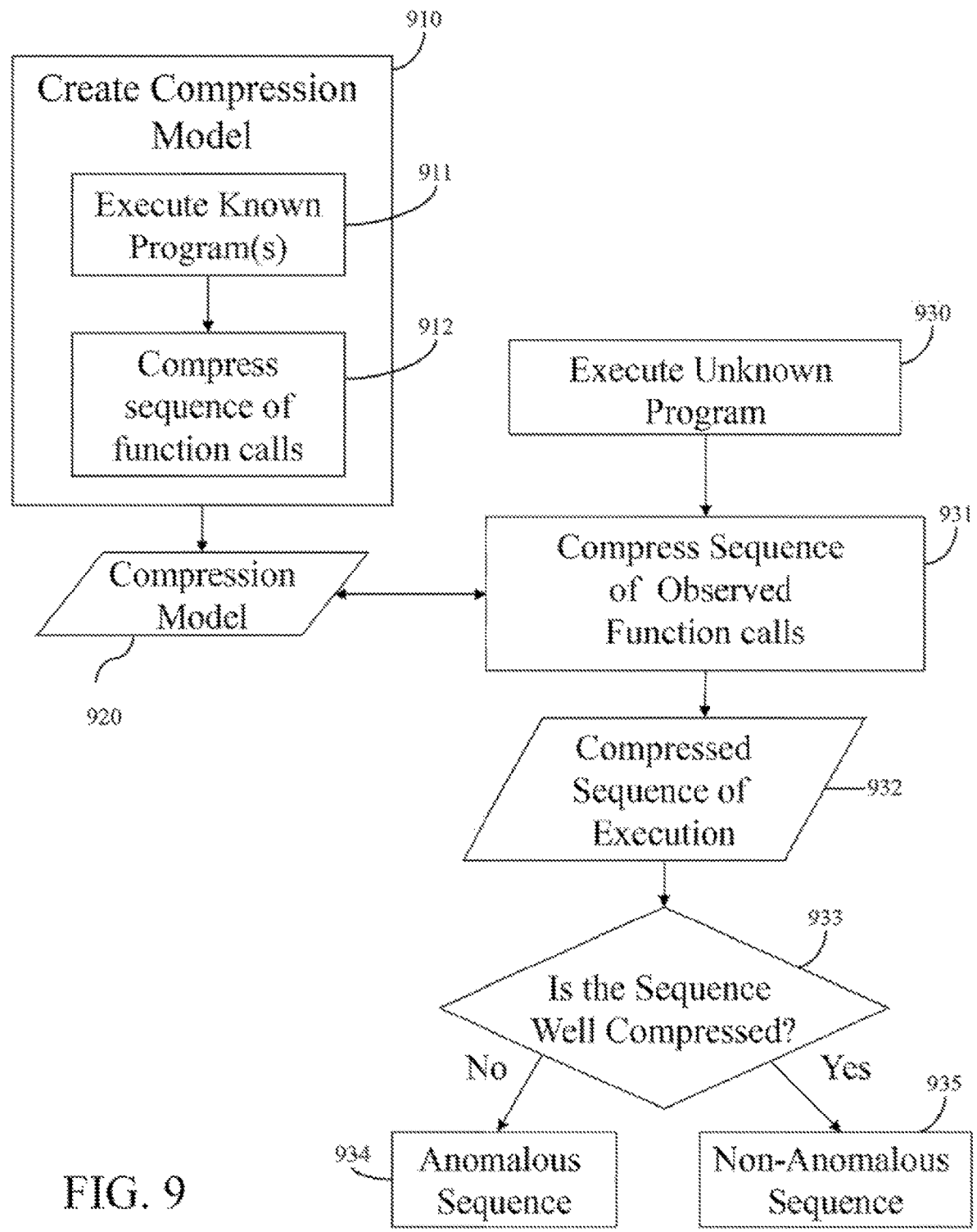
FIG. 9 shows a simplified illustration of methods for generating a compression model and detecting an anomalous sequence of function calls in accordance with some embodiments.

FIG. 9 illustrates a method for the creation of a compression model at 910. This can include executing, at 911, one or more known non-anomalous programs and compressing, at 912, sequence of observed function calls, to generate a compression model 920. A test program can be executed, at 930, and a sequence of function calls resulting from the program's execution can be compressed, at 931, using compression model 920, to generate a compressed sequence of function calls 932. It can be determined, at 933, whether the compressed sequence 932 is well compressed. This can be based on, for example, the percent of function calls that were not compressed, the length of various sequences of uncompressed function calls, the distance between uncompressed function calls, the density and/or distribution of uncompressed function calls, and/or the number of unique uncompressed sequences and/or unique uncompressed function calls. If the compressed sequence 932 is well compressed, it can be considered non-anomalous, at 935. If it is not well compressed, it can be considered anomalous, at 934. If a program execution is considered anomalous, various recovery actions can be performed, such as those described herein. In some embodiments, programs executed at 911 can be known anomalous programs and determinations of a sequence 932 being well compressed can indicate anomalous sequences. Some embodiments can create various models 920, including models of both anomalous and non-anomalous programs. In such embodiments, a compressed sequence 931 can be compared to various models.

In some embodiments, execution, at 930, can include execution of all or part of a program and can be performed, for example, natively or in an emulator. If an anomalous sequence is detected, at 933, one or more of the function calls and/or the order of the function calls can be altered to make the sequence of function calls non-anomalous, execution 930 can be rolled back, and/or execution 930 can be terminated. In various embodiments, a compressed sequence 932 may not be formed and/or stored in memory. Instead compression 931 can feed directly into the determination, at 933, of how well (or not well) a test program is compressed. The determination, at 933, can take place, for example, continuously during execution, at 930, at intervals and/or breaks in execution, at 930, or upon completion of execution, at 930. In various embodiments, differentiation of function calls (e.g. for assigning them a compression value) can be based on, for example, the value of an argument or arguments, the number of arguments, and/or the identity of the function (e.g., based on a memory address). In various embodiments, creation, at 910, execution, at 930, and/or determination, at 933, can take place on the same digital processing device or on different digital processing devices. Compression model 920 can include various compression models formed by executing various training data on various digital processing devices.

A probabilistic anomaly detection (PAD) algorithm can also be used to train a model for detecting anomalies. In various embodiments such a model can be used in place of, in addition to, or in combination with, for example, a compression model (e.g., model 926). This model may be, in essence, a density estimation, where the estimation of a density function p(x) over normal data allows the definition of anomalies as data elements that occur with low probability. The detection of low probability data (or events) are represented as consistency checks over the normal data, where a record is labeled anomalous if it fails any one of these tests.

First and second order consistency checks can be applied. First order consistency checks verify that a value is consistent with observed values of that feature in the normal data set. These first order checks compute the likelihood of an observation of a given feature, P(Xi), where Xi are the feature variables. Second order consistency checks determine the conditional probability of a feature value given another feature value, denoted by P(Xi|Xj), where Xi and Xj are the feature variables.

One way to compute these probabilities is to estimate a multinomial that computes the ratio of the counts of a given element to the total counts. However, this results in a biased estimator when there is a sparse data set. Another approach is to use an estimator to determine these probability distributions. For example, let N be the total number of observations, Ni be the number of observations of symbol i, $\alpha$ be the "pseudo count" that is added to the count of each observed symbol, $k^0$ be the number of observed symbols, and L be the total number of possible symbols. Using these definitions, the probability for an observed element i can be given by:

$$P(X=i) = \frac{N_i + \alpha}{k^0 \alpha + N} C \qquad (1)$$

and the probability for an unobserved element i can be:

$$P(X=i) = \frac{1}{L-k^0}(1-C) \qquad (2)$$

where C, the scaling factor, accounts for the likelihood of observing a previously observed element versus an unobserved element. C can be computed as:

$$C = \left(\sum_{k=k^0}^{L} \frac{k^0 \alpha + N}{k\alpha + N} m_k\right)\left(\sum_{k \geq k^0} m_k\right)^{-1} \qquad (3)$$

where $$m_k = P(S=k)\frac{k!}{k=k^0}\frac{\Gamma(k\alpha)}{\Gamma(k\alpha + N)}$$

and P(s=k) is a prior probability associated with the size of the subset of elements in the alphabet that have non-zero probability.

Because this computation of C can be time consuming, C can also be calculated by:

$$C = \frac{N}{N+L-k^0} \qquad (4)$$

The consistency check can be normalized to account for the number of possible outcomes of L by log(P/(1/L))=log(P)+log(L).

Another approach that may be used instead of using PAD for model generation and anomaly detection is a one class SVM (OCSVM) algorithm. The OCSVM algorithm can be used to map input data into a high dimensional feature space (via a kernel) and iteratively find the maximal margin hyperplane which best separates the training data from the origin. The OCSVM may be viewed as a regular two-class SVM where all the training data lies in the first class, and the origin is taken as the only member of the second class. Thus, the hyperplane (or linear decision boundary) can correspond to the classification rule:

$$f(x) = \langle w, x \rangle + b \qquad (5)$$

where w is the normal vector and b is a bias term. The OCSVM can be used to solve an optimization problem to find the rule f with maximal geometric margin. This classification rule can be used to assign a label to a test example x. If f(x)<0, x can be labeled as an anomaly, otherwise it can be labeled as normal. In practice, there is a trade-off between maximizing the distance of the hyperplane from the origin and the number of training data points contained in the region separated from the origin by the hyperplane.

Solving the OCSVM optimization problem can be equivalent to solving the dual quadratic programming problem:

$$\min_{\alpha} \frac{1}{2} \sum_{ij} \alpha_i \alpha_j K(x_i, x_j) \qquad (6)$$

subject to the constraints $$0 \le \alpha_i \le \frac{1}{vl} \qquad (7)$$

and $$\sum_i \alpha_i = 1 \qquad (8)$$

where $\alpha_i$ is a lagrange multiplier (or "weight" on example i such that vectors associated with non-zero weights are called "support vectors" and solely determine the optimal hyperplane), v is a parameter that controls the trade-off between maximizing the distance of the hyperplane from the origin and the number of data points contained by the hyperplane, l is the number of points in the training dataset, and $K(x_i, x_j)$ is the kernel function. By using the kernel function to project input vectors into a feature space, nonlinear decision boundaries can be allowed for. Given a feature map:

$$\phi : X \to \mathbb{R}^N \qquad (9)$$

where $\Phi$ maps training vectors from input space X to a high-dimensional feature space, the kernel function can be defined as:

$$K(x,y) = \langle \phi(x), \phi(y) \rangle \qquad (10)$$

Feature vectors need not be computed explicitly, and computational efficiency can be improved by directly computing kernel values K(x, y). Three common kernels can be used:

Linear kernel: $K(x,y) = (x \cdot y)$
Polynomial kernel: $K(x,y) = (x \cdot y + 1)^d$, where d is the degree of the polynomial
Gaussian kernel: $K(x,y) = e^{-\|x-y\|^2/(2\sigma^2)}$, where $\sigma^2$ is the variance Kernels from binary feature vectors can be obtained by mapping a record into a feature space such that there is one dimension for every unique entry for each record value. A particular record can have the value 1 in the dimensions which correspond to each of its specific record entries, and the value 0 for every other dimension in feature space. Linear kernels, second order polynomial kernels, and gaussian kernels can be calculated using these feature vectors for each record. Kernels can also be calculated from frequency-based feature vectors such that, for any given record, each feature corresponds to the number of occurrences of the corresponding record component in the training set. For example, if the second component of a record occurs three times in the training set, the second feature value for that record is three. These frequency-based feature vectors can be used to compute linear and polynomial kernels.

According to various embodiments, "mimicry attacks" which might otherwise thwart OS system call level anomaly detectors by using normal appearing sequences of system calls can be detected. For example, mimicry attacks are less likely to be detected when the system calls are only modeled as tokens from an alphabet, without any information about arguments. Therefore, according to various embodiments, the models used are enriched with information about the arguments (data) such that it may be easier to detect mimicry attacks.

According to various embodiments, models are shared among many members of a community running the same application (referred to as an "application community"). In particular, some embodiments can share models with each other and/or update each other's models such that the learning of anomaly detection models is relatively quick. For example, instead of running a particular application for days at a single site, according to various embodiments, thousands of replicated applications can be run for a short period of time (e.g., one hour), and the models created based on the distributed data can be shared. While only a portion of each application instance may be monitored, for example, the entire software body can be monitored across the entire community. This can enable the rapid acquisition of statistics, and relatively fast learning of an application profile by sharing, for example, aggregate information (rather than the actual raw data used to construct the model).

Model sharing can result in one standard model that an attacker could potentially access and use to craft a mimicry attack. Therefore, according to various embodiments, unique and diversified models can be created. For example, such unique and diversified models can be created by randomly choosing particular features from the application execution that is modeled, such that the various application instances compute distinct models. In this manner, attacks may need to avoid detection by multiple models, rather than just a single model. Creating unique and diversified models not only has the advantage of being more resistant to mimicry attacks, but also may be more efficient. For example, if only a portion of an application is modeled by each member of an application community, monitoring will generally be simpler (and cheaper) for each member of the community. In the event that one or more members of an application community are attacked, according to various embodiments, the attack (or fault) will be detected, and patches or a signature can be provided to those community members who are blind to the crafted attack (or fault).

Random (distinct) model building and random probing may be controlled by a software registration key provided by a commercial off-the-shelf (COTS) software vendor or some other data providing "randomization." For example, for each member of an application community, some particular randomly chosen function or functions and its associated data may be chosen for modeling, while others may simply be ignored. Moreover, because vendors can generate distinct keys and serial numbers when distributing their software, this feature can be used to create a distinct random subset of functions to be modeled. Also, according to various embodiments, even community members who model the same function or functions may exchange models.

According to various embodiments, when an application execution is being analyzed over many copies distributed among a number of application community members to profile the entire code of an application, it can be determined whether there are any segments of code that are either rarely or never executed, and a map can be provided of the code layout identifying "suspect code segments" for deeper analysis and perhaps deeper monitoring. Those segments identified as rarely or never executed may harbor vulnerabilities not yet executed or exploited. Such segments of code may have been designed to execute only for very special purposes such as error handling, or perhaps even for triggering malicious code embedded in the application. Since they are rarely or never executed, one may presume that such code segments have had less regression testing, and may have a higher likelihood of harboring faulty code.

Rarely or never executed code segments may be identified and may be monitored more thoroughly through, for example, emulation. This deep monitoring may have no discernible overhead since the code in question is rarely or never executed. But such monitoring performed in each community member may prevent future disasters by preventing such code (and its likely vulnerabilities) from being executed in a malicious/faulty manner. Identifying such code may be performed by a sensor that monitors loaded modules into the running application (e.g., DLL loads) as well as addresses (PC values) during code execution and creates a "frequency" map of ranges of the application code. For example, a set of such distributed sensors may communicate with each other (or through some site that correlates their collective information) to create a central, global MAP of the application execution profile. This profile may then be used to identify suspect code segments, and then subsequently, this information may be useful to assign different kinds of sensors/monitors to different code segments. For example, an interrupt service routine (ISR) may be applied to these suspect sections of code.

It is noted that a single application instance may have to be run many times (e.g., thousands of times) in order to compute an application profile or model. However, distributed sensors whose data is correlated among many (e.g., a thousand) application community members can be used to compute a substantially accurate code profile in a relatively short amount of time. This time may be viewed as a "training period" to create the code map.

According to various embodiments, models may be automatically updated as time progresses. For example, although a single site may learn a particular model over some period of time, application behavior may change over time. In this case, the previously learned model may no longer accurately reflect the application characteristics, resulting in, for example, the generation of an excessive amount of false alarms (and thus an increase in the false positive rate over time). A possible solution to this "concept drift" issue entails at least two possible approaches, both intended to update models over time. A first approach to solving (or at least reducing the effects of) the "concept drift" issue involves the use of "incremental learning algorithms," which are algorithms that piecemeal update their models with new data, and that may also "expire" parts of the computed model created by older data. This piecemeal incremental approach is intended to result in continuous updating using relatively small amounts of data seen by the learning system.

A second approach to solving (or at least reducing the effect of) the "concept drift" issue involves combining multiple models. For example, presuming that an older model has been computed from older data during some "training epoch," a new model may be computed concurrently with a new epoch in which the old model is used to detect anomalous behavior. Once a new model is computed, the old model may be retired or expunged, and replaced by the new model. Alternatively, for example, multiple models such as described above may be combined. In this case, according to various embodiments, rather than expunging the old model, a newly created model can be algorithmically combined with the older model using any of a variety of suitable means. In the case of statistical models that are based upon frequency counts of individual data points, for example, an update may consist of an additive update of the frequency count table. For example, PAD may model data by computing the number of occurrences of a particular data item, "X." Two independently learned PAD models can thus have two different counts for the same value, and a new frequency table can be readily computed by summing the two counts, essentially merging two tables and updating common values with the sum of their respective counts.

According to various embodiments, the concept of model updating that is readily achieved in the case of computed PAD models may be used in connection with model sharing. For example, rather than computing two models by the same device for a distinct application, two distinct models may be computed by two distinct instances of an application by two distinct devices, as described above. The sharing of models may thus be implemented by the model update process described herein. Hence, a device may continuously learn and update its models either by computing its own new model, or by downloading a model from another application community member (e.g., using the same means involved in the combining of models).

In the manners described above, an application community may be configured to continuously refresh and update all community members, thereby making mimicry attacks far more difficult to achieve.

As mentioned above, it is possible to mitigate against faults or attacks by using patch generation systems. In accordance with various embodiments, when patches are generated, validated, and deployed, the patches and/or the set of all such patches may serve the following.

First, according to various embodiments, each patch may be used as a "pattern" to be used in searching other code for other unknown vulnerabilities. An error (or design flaw) in programming that is made by a programmer and that creates a vulnerability may show up elsewhere in code. Therefore, once a vulnerability is detected, the system may use the detected vulnerability (and patch) to learn about other (e.g., similar) vulnerabilities, which may be patched in advance of those vulnerabilities being exploited. In this manner, over time, a system may automatically reduce (or eliminate) vulnerabilities.

Second, according to various embodiments, previously generated patches may serve as exemplars for generating new patches. For example, over time, a taxonomy of patches may be assembled that are related along various syntactic and semantic dimensions. In this case, the generation of new patches may be aided by prior examples of patch generation.

Additionally, according to various embodiments, generated patches may themselves have direct economic value. For example, once generated, patches may be "sold" back to the vendors of the software that has been patched.

As mentioned above, in order to alleviate monitoring costs, instead of running a particular application for days at a single site, many (e.g., thousands) replicated versions of the application may be run for a shorter period of time (e.g., an hour) to obtain the necessary models. In this case, only a portion of each replicated version of the application may be monitored, although the entire software body is monitored using the community of monitored software applications. Moreover, according to various embodiments, if a software module has been detected as faulty, and a patch has been generated to repair it, that portion of the software module, or the entire software module, may no longer need to be monitored. In this case, over time, patch generated systems may have fewer audit/monitoring points, and may thus improve in execution speed and performance. Therefore, according to various embodiments, software systems may be improved, where vulnerabilities are removed, and the need for monitoring is reduced (thereby reducing the costs and overheads involved with detecting faults).

It is noted that, although described immediately above with regard to an application community, the notion of automatically identifying faults of an application, improving the application over time by repairing the faults, and eliminating monitoring costs as repairs are deployed may also be applied to a single, standalone instance of an application (without requiring placements as part of a set of monitored application instances).

Selective transactional emulation (STEM) and error virtualization can be beneficial for reacting to detected failures, attacks, and or anomalous behavior in software. According to various embodiments, STEM and error virtualization can be used to provide enhanced detection of some types of attacks, and enhanced reaction mechanisms to some types of attacks/failures.

A learning technique can be applied over multiple executions of a piece of code (e.g., a function or collection of functions) that may previously have been associated with a failure, or that is being proactively monitored. By retaining knowledge on program behavior across multiple executions, certain invariants (or probable invariants) may be learned, whose violation in future executions indicates an attack or imminent software fault.

In the case of control hijacking attacks, certain control data that resides in memory is overwritten through some mechanism by an attacker. That control data is then used by the program for an internal operation, allowing the attacker to subvert the program. Various forms of buffer overflow attacks (stack and heap smashing, jump into libc, etc.) operate in this fashion. Such attacks can be detected when the corrupted control data is about to be used by the program (i.e., after the attack has succeeded). In various embodiments, such control data (e.g., memory locations or registers that hold such data) that is about to be overwritten with "tainted" data, or data provided by the network (which is potentially malicious) can be detected.

In accordance with various embodiments, how data modifications propagate throughout program execution can be monitored by maintaining a memory bit for every byte or word in memory. This bit is set for a memory location when a machine instruction uses as input data that was provided as input to the program (e.g., was received over the network, and is thus possibly malicious) and produces output that is stored in this memory location. If a control instruction (such as a JUMP or CALL) uses as an argument a value in a memory location in which the bit is set (i.e., the memory location is "tainted"), the program or the supervisory code that monitors program behavior can recognize an anomaly and raises an exception.

Detecting corruption before it happens, rather than later (when the corrupted data is about to be used by a control instruction), makes it possible to stop an operation and to discard its results/output, without other collateral damage. Furthermore, in addition to simply retaining knowledge of what is control and what is non-control data, according to various embodiments, knowledge of which instructions in the monitored piece of code typically modify specific memory locations can also be retained. Therefore, it is possible to detect attacks that compromise data that are used by the program computation itself, and not just for the program control flow management.

According to various embodiments, the inputs to the instruction(s) that can fail (or that can be exploited in an attack) and the outputs (results) of such instructions can be correlated with the inputs to the program at large. Inputs to an instruction are registers or locations in memory that contain values that may have been derived (in full or partially) by the input to the program. By computing a probability distribution model on the program input, alternate inputs may be chosen to give to the instruction or the function ("input rewriting" or "input modification") when an imminent failure is detected, thereby allowing the program to "sidestep" the failure. However, because doing so may still cause the program to fail, according to various embodiments, micro-speculation (e.g., as implemented by STEM) can optionally be used to verify the effect of taking this course of action. A recovery technique (with different input values or error virtualization, for example) can then be used. Alternatively, for example, the output of the instruction may be caused to be a value/result that is typically seen when executing the program ("output overloading").

In both cases (input modification or output overloading), the values to use may be selected based on several different criteria, including but not limited to one or more of the following: the similarity of the program input that caused failure to other inputs that have not caused a failure; the most frequently seen input or output value for that instruction, based on contextual information (e.g., when particular sequence of functions are in the program call stack); and most frequently seen input or output value for that instruction across all executions of the instruction (in all contexts seen). For example, if a particular DIVIDE instruction is detected in a function that uses a denominator value of zero, which would cause a process exception, and subsequently program failure, the DIVIDE instruction can be executed with a different denominator (e.g., based on how similar the program input is to other program inputs seen in the past, and the denominator values that these executions used). Alternatively, the DIVIDE instruction may be treated as though it had given a particular division result. The program may then be allowed to continue executing, while its behavior is being monitored. Should a failure subsequently occur while still under monitoring, a different input or output value for the instruction can be used, for example, or a different repair technique can be used. According to various embodiments, if none of the above strategies is successful, the user or administrator may be notified, program execution may be terminated, a rollback to a known good state (ignoring the current program execution) may take place, and/or some other corrective action may be taken.

According to various embodiments, the techniques used to learn typical data can be implemented as designer choice. For example, if it is assumed that the data modeled is 32-bit words, a probability distribution of this range of values can be estimated by sampling from multiple executions of the program. Alternatively, various cluster-based analyses may partition the space of typical data into clusters that represent groups of similar/related data by some criteria. Vector Quantization techniques representing common and similar data based on some "similarity" measure or criteria may also be compiled and used to guide modeling.

Figure 1:
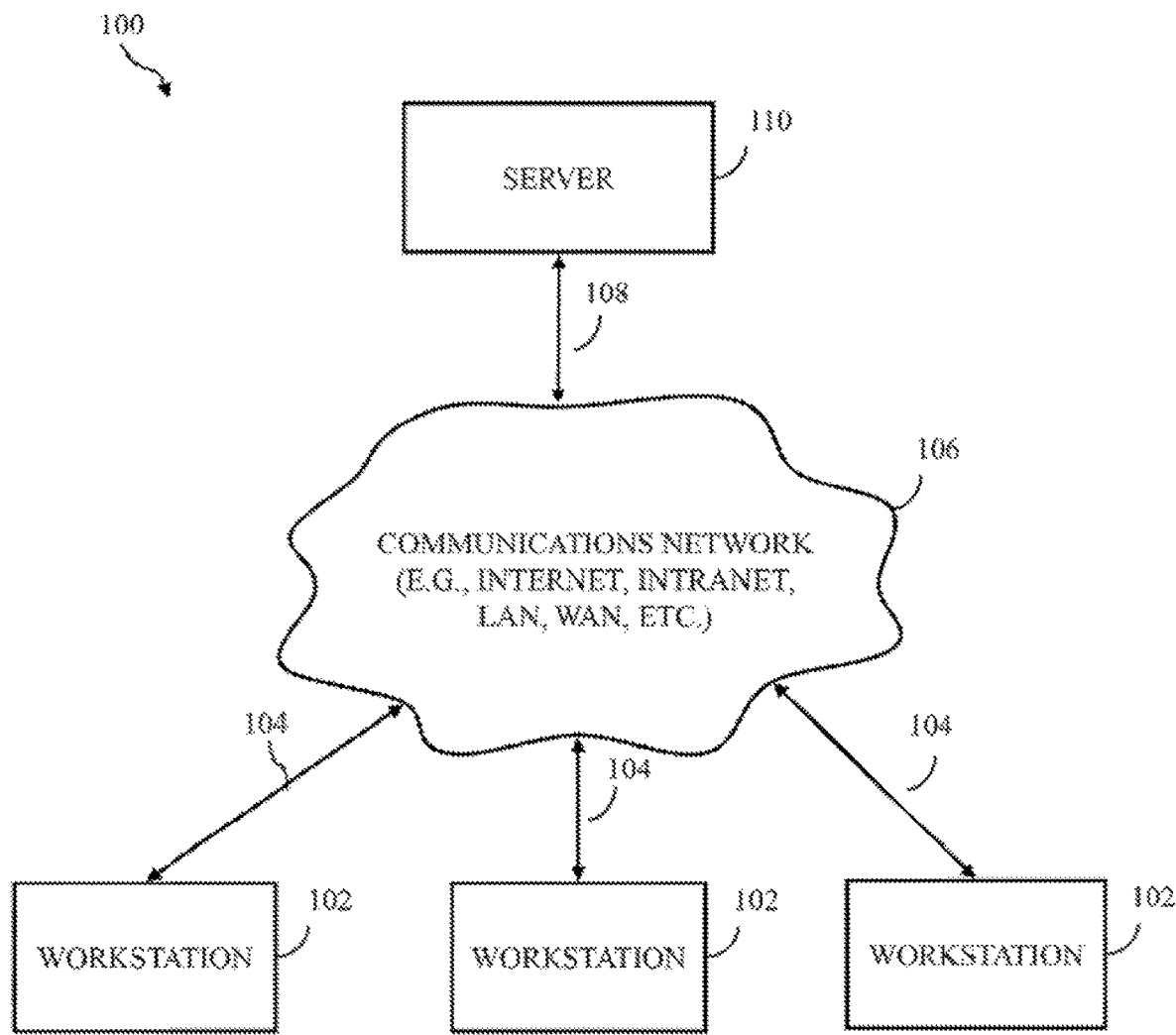
FIG. 1 is a schematic diagram of an illustrative system suitable for implementation of an application that monitors other applications and protects these applications against faults in accordance with some embodiments.

FIG. 1 is a schematic diagram of an illustrative system 100 suitable for implementation of various embodiments. As illustrated in FIG. 1, system 100 may include one or more workstations 102. Workstations 102 can be local to each other or remote from each other, and can be connected by one or more communications links 104 to a communications network 106 that is linked via a communications link 108 to a server 110.

In system 100, server 110 may be any suitable server for executing the application, such as a processor, a computer, a data processing device, or a combination of such devices. Communications network 106 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 104 and 108 may be any communications links suitable for communicating data between workstations 102 and server 110, such as network links, dial-up links, wireless links, hard-wired links, etc. Workstations 102 may be personal computers, laptop computers, mainframe computers, data displays, Internet browsers, personal digital assistants (PDAs), two-way pagers, wireless terminals, portable telephones, etc., or any combination of the same. Workstations 102 and server 110 may be located at any suitable location. In one embodiment, workstations 102 and server 110 may be located within an organization. Alternatively, workstations 102 and server 110 may be distributed between multiple organizations.

Figure 2:
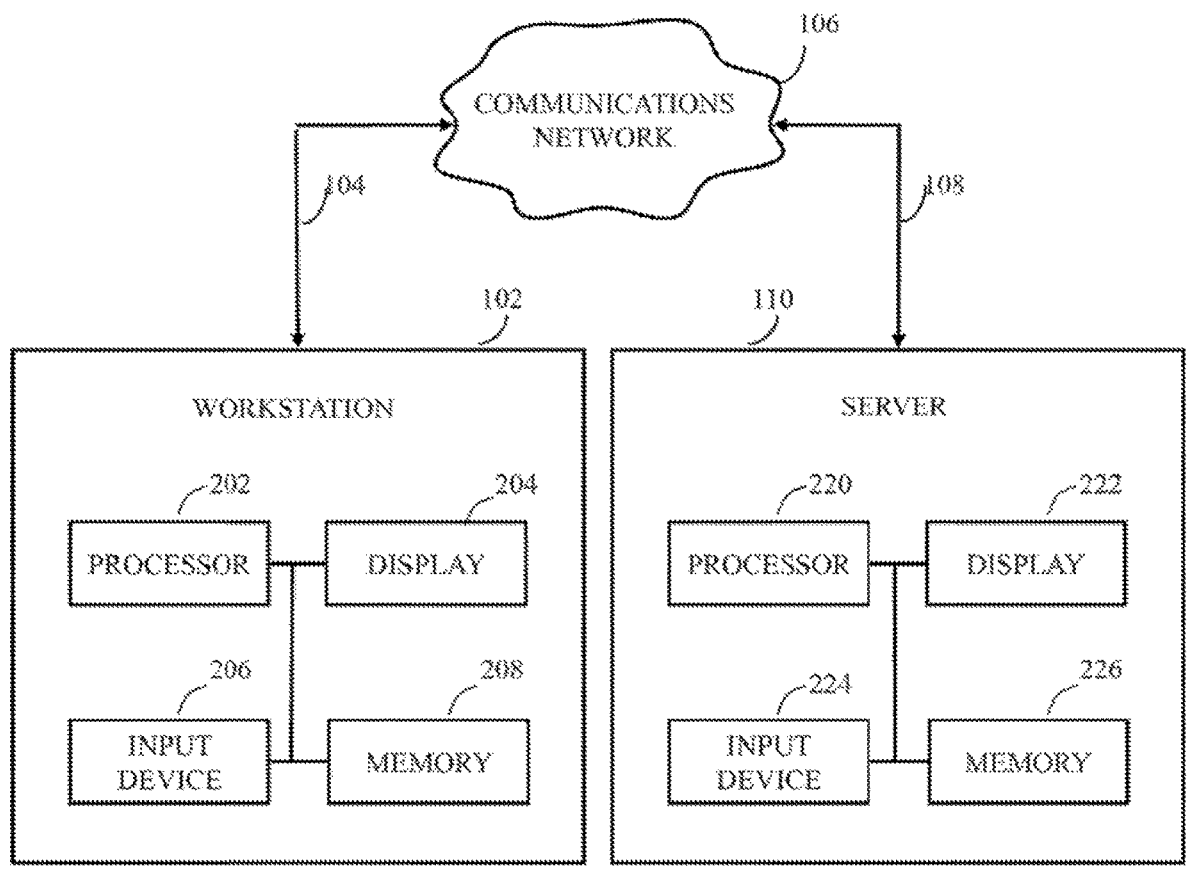
FIG. 2 is a detailed example of the server and one of the workstations of FIG. 1 that may be used in accordance with some embodiments.

The server and one of the workstations, which are depicted in FIG. 1, are illustrated in more detail in FIG. 2. Referring to FIG. 2, workstation 102 may include digital processing device (such as a processor) 202, display 204, input device 206, and memory 208, which may be interconnected. In a preferred embodiment, memory 208 contains a storage device for storing a workstation program for controlling processor 202. Memory 208 may also contain an application for detecting an anomalous sequence of function calls and/or detecting and repairing applications from faults according to various embodiments. In some embodiments, the application may be resident in the memory of workstation 102 or server 110.

Processor 202 may use the workstation program to present on display 204 the application and the data received through communication link 104 and commands and values transmitted by a user of workstation 102. It should also be noted that data received through communication link 104 or any other communications links may be received from any suitable source, such as web services. Input device 206 may be a computer keyboard, a cursor-controller, a dial, a switchbank, lever, or any other suitable input device as would be used by a designer of input systems or process control systems.

Server 110 may include processor 220, display 222, input device 224, and memory 226, which may be interconnected. In some embodiments, memory 226 contains a storage device for storing data received through communication link 108 or through other links, and also receives commands and values transmitted by one or more users. The storage device can further contain a server program for controlling processor 220.

In accordance with some embodiments, a self-healing system that allows an application to automatically recover from software failures and attacks is provided. By selectively emulating at least a portion or all of the application's code when the system detects that a fault has occurred, the system surrounds the detected fault to validate the operands to machine instructions, as appropriate for the type of fault. The system emulates that portion of the application's code with a fix and updates the application. This increases service availability in the presence of general software bugs, software failures, attacks.

Figure 3:
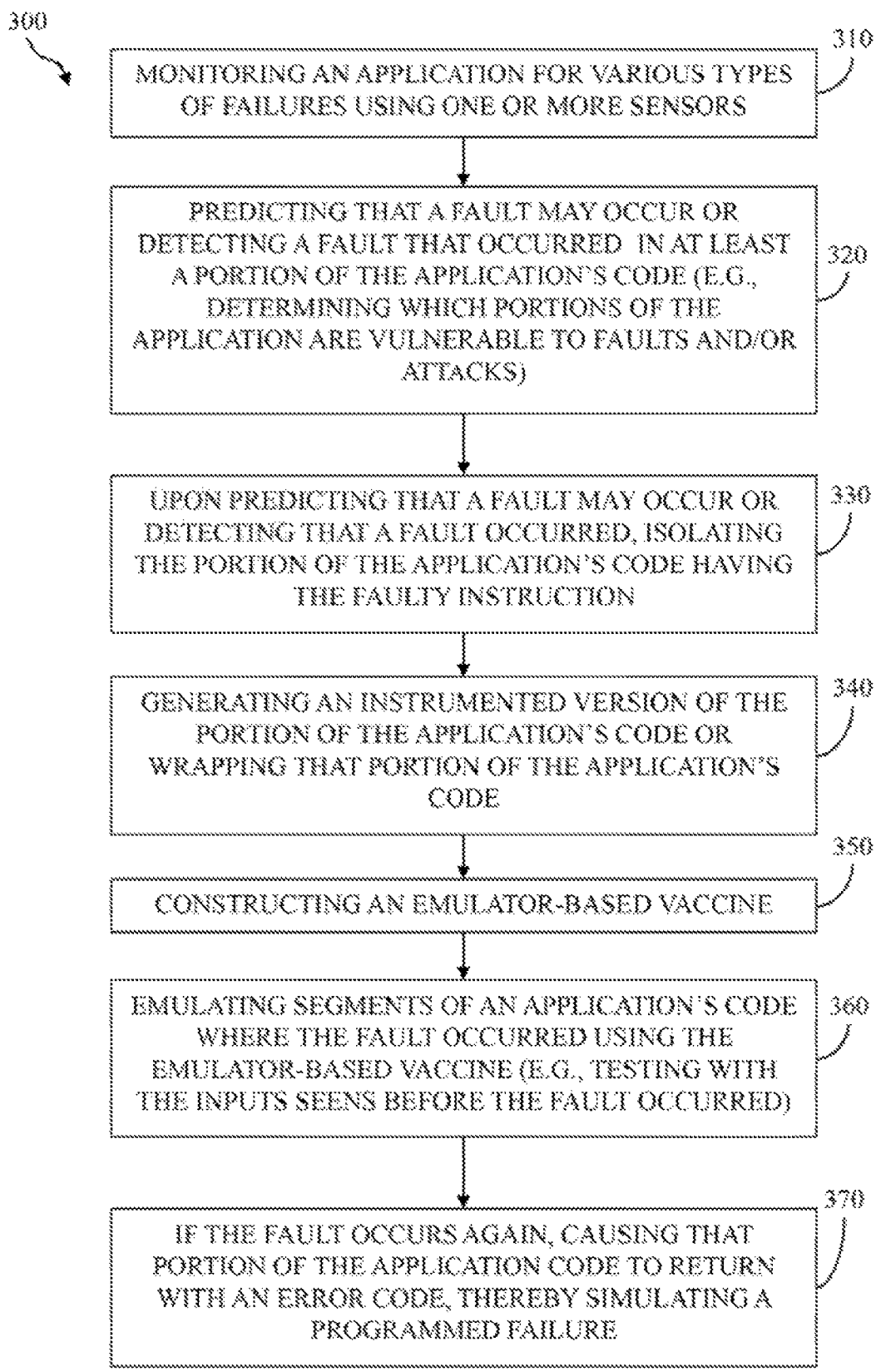
FIG. 3 shows a simplified diagram illustrating repairing faults in an application and updating the application in accordance with some embodiments.
Figure 4:
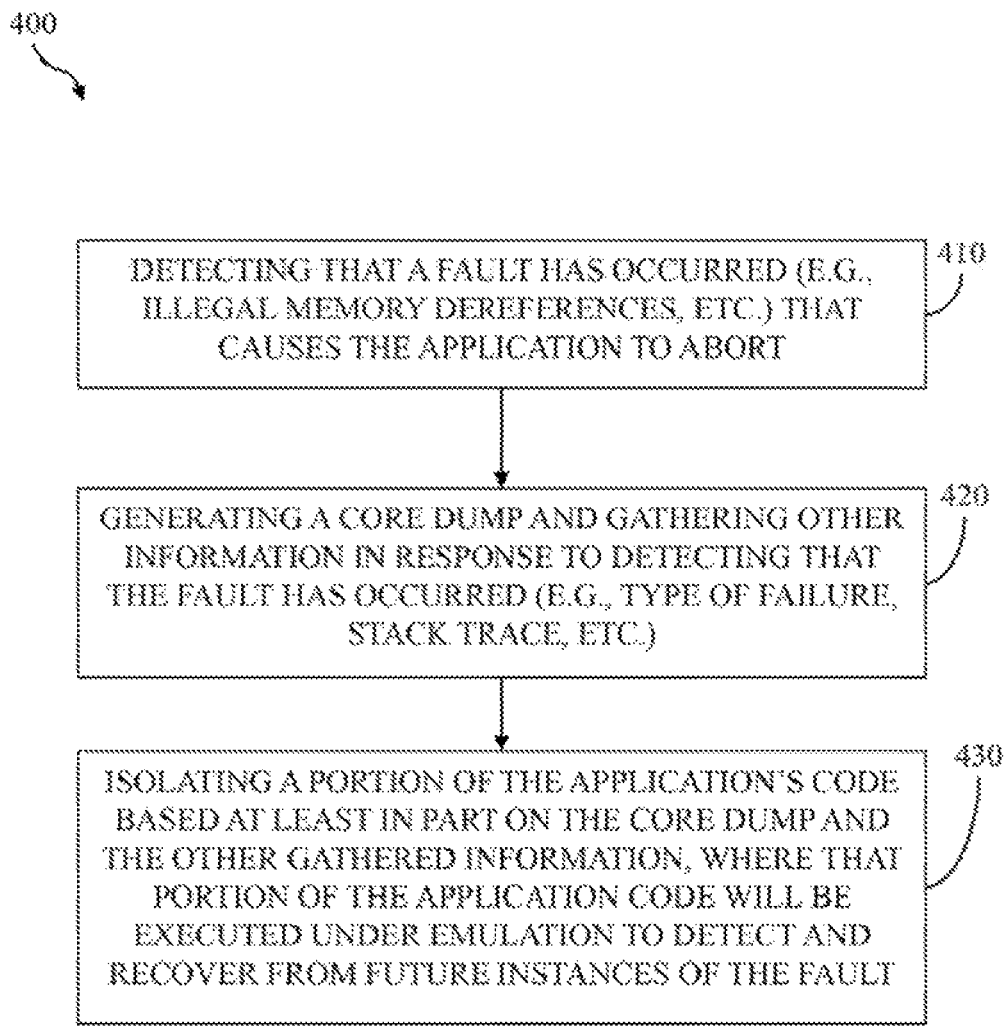
FIG. 4 shows a simplified diagram illustrating detecting and repairing an application in response to a fault occurring in accordance with some embodiments.

Turning to FIGS. 3 and 4, simplified flowcharts illustrating various steps performed in detecting faults in an application and fixing the application in accordance with some embodiments are provided. These are generalized flow charts. It will be understood that the steps shown in FIGS. 3 and 4 may be performed in any suitable order, some may be deleted, and others added.

Generally, process 300 begins by detecting various types of failures in one or more applications at 310 (in some embodiments, this detection can occur, for example, at 930 and/or 933 of FIG. 9). In some embodiments, detecting for failures may include monitoring the one or more applications for failures, e.g., by using an anomaly detector as described herein. In some embodiments, the monitoring or detecting of failures may be performed using one or more sensors at 310. Failures include programming errors, exceptions, software faults (e.g., illegal memory accesses, division by zero, buffer overflow attacks, time-of-check-to-time-of-use (TOCTTOU) violations, etc.), threats (e.g., computer viruses, worms, trojans, hackers, key recovery attacks, malicious executables, probes, etc.), and any other suitable fault that may cause abnormal application termination or adversely affect the one or more applications.

Any suitable sensors may be used to detect failures or monitor the one or more applications. For example, in some embodiments, anomaly detectors as described herein can be used.

At 320, feedback from the sensors may be used to predict which parts of a given application's code may be vulnerable to a particular class of attack (e.g., remotely exploitable buffer overflows). In some embodiments, the sensors may also detect that a fault has occurred. Upon predicting that a fault may occur or detecting that a fault has occurred, the portion of the application's code having the faulty instruction or vulnerable function can be isolated, thereby localizing predicted faults at 330.

Alternatively, as shown and discussed in FIG. 4, the one or more sensor may monitor the application until it is caused to abnormally terminate. The system may detect that a fault has occurred, thereby causing the actual application to terminate. As shown in FIG. 4, at 410, the system forces a misbehaving application to abort. In response to the application terminating, the system generates a core dump file or produces other failure-related information, at 420. The core dump file may include, for example, the type of failure and the stack trace when that failure occurred. Based at least in part on the core dump file, the system isolates the portion of the application's code that contains the faulty instruction at 430. Using the core dump file, the system may apply selective emulation to the isolated portion or slice of the application. For example, the system may start with the top-most function in the stack trace.

Referring back to FIG. 3, in some embodiments, the system may generate an instrumented version of the application (340). For example, an instrumented version of the application may be a copy of a portion of the application's code or all of the application's code. The system may observe instrumented portions of the application. These portions of the application may be selected based on vulnerability to a particular class of attack. The instrumented application may be executed on the server that is currently running the one or more applications, a separate server, a workstation, or any other suitable device.

Isolating a portion of the application's code and using the emulator on the portion allows the system to reduce and/or minimize the performance impact on the immunized application. However, while this embodiment isolates a portion or a slice of the application's code, the entire application may also be emulated. The emulator may be implemented completely in software, or may take advantage of hardware features of the system processor or architecture, or other facilities offered by the operating system to otherwise reduce and/or minimize the performance impact of monitoring and emulation, and to improve accuracy and effectiveness in handling failures.

An attempt to exploit such a vulnerability exposes the attack or input vector and other related information (e.g., attacked buffer, vulnerable function, stack trace, etc.). The attack or input vector and other related information can then be used to construct a vaccine. A vaccine can be of various forms, such as, for example, but not limited to, an emulator-based vaccine, source-code changes, binary rewriting, a fix that implements array bounds checking at the machine-instruction level at 350, and/or other fixes based on, for example, the detected type of failure. The vaccine can then be tested in the instrumented application using, for example, an instruction-level emulator (e.g., libtasvm x86 emulator, STEM x86 emulator, etc.) to determine whether the fault was fixed and whether any other functionality (e.g., critical functionality) has been impacted by the fix.

By continuously testing various vaccines using the instruction-level emulator, the system can verify whether the specific fault has been repaired by running the instrumented application against the event sequence (e.g., input vectors) that caused the specific fault. For example, to verify the effectiveness of a fix, the application may be restarted in a test environment or a sandbox with the instrumentation enabled, and is supplied with the one or more input vectors that caused the failure. A sandbox generally creates an environment in which there are strict limitations on which system resources the instrumented application or a function of the application may request or access.

At 360, the instruction-level emulator can be selectively invoked for segments of the application's code, thereby allowing the system to mix emulated and non-emulated code within the same code execution. The emulator may be used to, for example, detect and/or monitor for a specific type of failure prior to executing the instruction, record memory modifications during the execution of the instruction (e.g., global variables, library-internal state, libc standard I/O structures, etc.) and the original values, revert the memory stack to its original state, and simulate an error return from a function of the application. That is, upon entering the vulnerable section of the application's code, the instruction-level emulator can capture and store the program state and processes all instructions, including function calls, inside the area designated for emulation. When the program counter references the first instruction outside the bounds of emulation, the virtual processor copies its internal state back to the device processor registers. While registers are updated, memory updates are also applied through the execution of the emulation. The program, unaware of the instructions executed by the virtual processor, continues normal execution on the actual processor.

In some embodiments, the instruction-level emulator may be linked with the application in advance. Alternatively, in response to a detected failure, the instruction-level emulator may be compiled in the code. In another suitable embodiment, the instruction-level emulator may be invoked in a manner similar to a modern debugger when a particular program instruction is executed. This can take advantage of breakpoint registers and/or other program debugging facilities that the system processor and architecture possess, or it can be a pure-software approach.

The use of an emulator allows the system to detect and/or monitor a wide array of software failures, such as illegal memory dereferences, buffer overflows, and buffer underflows, and more generic faults, such as divisions by zero. The emulator checks the operands of the instructions it is about to emulate using, at least partially, the vector and related information provided by the one or more sensors that detected the fault. For example, in the case of a division by zero, the emulator checks the value of the operand to the div instruction. In another example, in the case of illegal memory dereferencing, the emulator verifies whether the source and destination address of any memory access (or the program counter for instruction fetches) points to a page that is mapped to the process address space using the mincore( ) system call, or the appropriate facilities provided by the operating system. In yet another example, in the case of buffer overflow detection, the memory surrounding the vulnerable buffer, as identified by the one or more sensors, is padded by one byte. The emulator then watches for memory writes to these memory locations. This may require source code availability so as to insert particular variables (e.g., canary variables that launch themselves periodically and perform some typical user transaction to enable transaction-latency evaluation around the clock). The emulator can thus prevent the overflow before it overwrites the remaining locations in the memory stack and recovers the execution. Other approaches for detecting these failures may be incorporated in the system in a modular way, without impacting the high-level operation and characteristics of the system.

For example, the instruction-level emulator may be implemented as a statically-linked C library that defines special tags (e.g., a combination of macros and function calls) that mark the beginning and the end of selective emulation. An example of the tags that are placed around a segment of the application's code for emulation by the instruction-level emulator is shown in FIG. 5. As shown in FIG. 5, the C macro emulate_init( ) moves the program state (general, segment, eflags, and FPU registers) into an emulator-accessible global data structure to capture state immediately before the emulator takes control. The data structure can be used to initialize the virtual registers. emulate_begin( ) obtains the memory location of the first instruction following the call to itself. The instruction address may be the same as the return address and can be found in the activation record of emulate_begin( ) four bytes above its base stack pointer. The fetch/decode/execute/retire cycle of instructions can continue until either emulate_end( ) is reached or when the emulator detects that control is returning to the parent function. If the emulator does not encounter an error during its execution, the emulator's instruction pointer references the emulate_term( ) macro at completion. To enable the instrumented application to continue execution at this address, the return address of the emulate_begin( ) activation record can be replaced with the current value of the instruction pointer. By executing emulate_term( ) the emulator's environment can be copied to the program registers and execution continues under normal conditions.

Although the emulator can be linked with the vulnerable application when the source code of the vulnerable application is available, in some embodiments the processor's programmable breakpoint register can be used to invoke the emulator without the running process even being able to detect that it is now running under an emulator.

In addition to monitoring for failures prior to executing instructions and reverting memory changes made by a particular function when a failure occurs (e.g., by having the emulator store memory modifications made during its execution), the emulator can also simulate an error return from the function. For example, some embodiments may generate a map between a set of errors that may occur during an application's execution and a limited set of errors that are explicitly handled by the application's code (sometimes referred to herein as "error virtualization"). As described below, the error virtualization features may be based on heuristics. However, any suitable approach for determining the return values for a function may be used. For example, aggressive source code analysis techniques to determine the return values that are appropriate for a function may be used. In another example, portions of code of specific functions can be marked as fail-safe and a specific value may be returned when an error return is forced (e.g., for code that checks user permissions). In yet another example, the error value returned for a function that has failed can be determined using information provided by a programmer, system administrator, or any other suitable user.

These error virtualization features allow an application to continue execution even though a boundary condition that was not originally predicted by a programmer allowed a fault to occur. In particular, error virtualization features allows for the application's code to be retrofitted with an exception catching mechanism, for faults that were unanticipated by the programmer. It should be noted that error virtualization is different from traditional exception handling as implemented by some programming languages, where the programmer must deliberately create exceptions in the program code and also add code to handle these exceptions. Under error virtualization, failures and exceptions that were unanticipated by, for example, the programmer can be caught, and existing application code can be used to handle them. In some embodiments, error virtualization can be implemented through the instruction-level emulator. Alternatively, error virtualization may be implemented through additional source code that is inserted in the application's source code directly. This insertion of such additional source code can be performed automatically, following the detection of a failure or following the prediction of a failure as described above, or it may be done under the direction of a programmer, system operator, or other suitable user having access to the application's source code.

Using error virtualization, when an exception occurs during the emulation or if the system detects that a fault has occurred, the system may return the program state to its original settings and force an error return from the currently executing function. To determine the appropriate error value, the system analyzes the declared type of function. In some embodiments, the system may analyze the declared type of function using, for example, a TXL script. Generally, TXL is a hybrid function and rule-based language that may be used for performing source-to-source transformation and for rapidly prototyping new languages and language processors. Based on the declared type of function, the system determines the appropriate error value and places it in the stack frame of the returning function. The appropriate error value may be determined based at least in part on heuristics. For example, if the return type is an int, a value of −1 is returned. If the return type is an unsigned int, the system returns a 0. If the function returns a pointer, the system determines whether the returned pointer is further dereferenced by the parent function. If the returned pointed is further dereferenced, the system expands the scope of the emulation to include the parent function. In another example, the return error code may be determined using information embedded in the source code of the application, or through additional information provided to the system by the application programmer, system administrator or third party.

In some embodiments, the emulate_end( ) is located and the emulation terminates. Because the emulator saved the state of the application before starting and kept track of memory modification during the application's execution, the system is capable of reversing any memory changes made by the code function inside which the fault occurred by returning it to its original setting, thereby nullifying the effect of the instructions processed through emulation. That is, the emulated portion of the code is sliced off and the execution of the code along with its side effects in terms of changes to memory have been rolled back.

For example, the emulator may not be able to perform system calls directly without kernel-level permissions. Therefore, when the emulator decodes an interruption with an intermediate value of 0x80, the emulator releases control to the kernel. However, before the kernel executes the system call, the emulator can back-up the real registers and replace them with its own values. An INT 0x80 can be issued by the emulator and the kernel processes the system call. Once control returns to the emulator, the emulator can update its registers and restore the original values in the application's registers.

If the instrumented application does not crash after the forced return, the system has successfully found a vaccine for the specific fault, which may be used on the actual application running on the server. At 370, the system can then update the application based at least in part on the emulation.

In accordance with some embodiments, artificial diversity features may be provided to mitigate the security risks of software monoculture.

Figure 6:
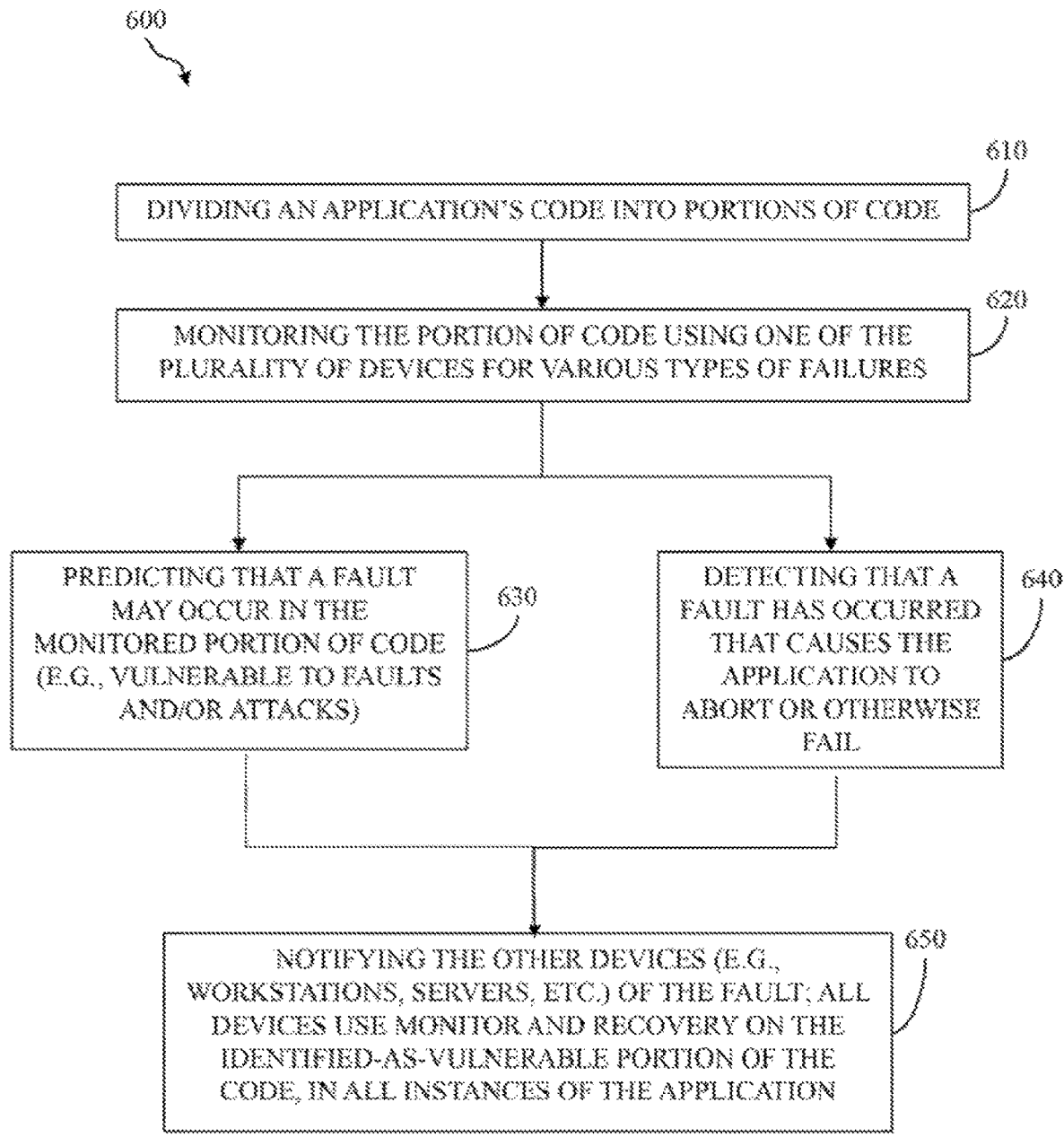
FIG. 6 shows a simplified diagram illustrating detecting and repairing an application using an application community in accordance with some embodiments of the disclosed subject matter.

FIG. 6 is a simplified flowchart illustrating the various steps performed in using an application community to monitor an application for faults and repair the application in accordance with some embodiments. This is a generalized flow chart. It will be understood that the steps shown in FIG. 6 may be performed in any suitable order, some may be deleted, and others added.

Generally, the system may divide an application's code into portions of code at 610. Each portion or slice of the application's code may, for example, be assigned to one of the members of the application community (e.g., workstation, server, etc.). Each member of the application community may monitor the portion of the code for various types of failures at 620. As described previously, failures include programming errors, exceptions, software faults (e.g., illegal memory accesses, division by zero, buffer overflow attacks, TOCTTOU violations, etc.), threats (e.g., computer viruses, worms, trojans, hackers, key recovery attacks, malicious executables, probes, etc.), and any other suitable fault that may cause abnormal application termination or adversely affect the one or more applications.

For example, the system may divide the portions of code based on the size of the application and the number of members in the application community (i.e., size of the application/members in the application community). Alternatively, the system may divide the portions of code based on the amount of available memory in each of the members of the application community. Any suitable approach for determining how to divide up the application's code may also be used. Some suitable approaches are described hereinafter.

For example, the system may examine the total work in the application community, W, by examining the cost of executing discrete slices of the application's code. Assuming a set of functions, F, that comprise an application's call-graph, the $i^{th}$ member of F is denoted as $f_i$. The cost of executing each $f_i$ is a function of the amount of computation present in $f_i$ (i.e., $x_i$) and the amount of risk in $f_i$ (i.e., $v_i$). The calculation of $x_i$ can be driven by at least two metrics: $o_i$, the number of machine instructions executed as part of and the amount of time spent executing $f_i$. Both $o_i$ and $t_i$ may vary as a function of time or application workload according to the application's internal logic. For example, an application may perform logging or cleanup duties after the application passes a threshold number of requests.

In some embodiments, a cost function may be provided in two phases. The first phase calculates the cost due to the amount of computation for each $f_i$. The second phase normalizes this cost and applies the risk factor $v_i$ to determine the final cost of each $f_i$ and the total amount of work in the system. For example, let $$T = \Sigma_{i=1}^{N} x_i$$

If $C(f_i, x_i) = x_i/T \ast 100$, each cost may be normalized by grouping a subset of F to represent one unit of work.

In some embodiments, the system may account for the measure of a function's vulnerability. For example, the system treats $v_i$ as a discrete variable with a value of $\alpha$, where a takes on a range of values according to the amount of risk such that:

$$v_i = \begin{cases} \alpha & \text{(if } f_i \text{ is vulnerable)} \\ 1 & \text{(if } f_i \text{ is not vulnerable)} \end{cases}$$

Given $v_i$ for each function, the system may determine the total amount of work in the system and the total number of members needed for monitoring:

$$W = N_{vuln} = \sum_{i=1}^{n} v_i \ast r_i$$

After the system (e.g., a controller) or after each application community member has calculated the amount of work in the system, work units can be distributed. In one example, a central controller or one of the workstations may assign each node approximately W/N work units. In another suitable example, each member of the application community may determine its own work set. Each member may iterate through the list of work units flipping a coin that is weighted with the value $v_i \ast r_i$. Therefore, if the result of the flip is "true," then the member adds that work unit to its work set.

Alternatively, the system may generate a list having n*W slots. Each function can be represented by a number of entries on the list (e.g., $v_i \ast r_i$). Every member of the application community can iterate through the list, for example, by randomly selecting true or false. If true, the application community member monitors the function of the application for a given time slice. Because heavily weighted functions have more entries in the list, a greater number of users may be assigned to cover the application. The member may stop when its total work reaches W/N. Such an approach offers statistical coverage of the application.

In some embodiments, a distributed bidding approach may be used to distribute the workload of monitoring and repairing an application. Each node in the callgraph G has a weight $v_i \ast r_i$. Some subset of the nodes in F is assigned to each application community member such that each member does no more work than W/N work. The threshold can be relaxed to be within some range $\epsilon$ of W/N, where $\epsilon$ is a measure of system fairness. Upon calculating the globally fair amount of work W/N, each application community member may adjust its workload by bargaining with other members using a distributed bidding approach.

Two considerations impact the assignment of work units to application community members. First, the system can allocate work units with higher weights, as these work units likely have a heavier weight due to a high $v_i$. Even if the weight is derived solely from the performance cost, assigning more members to the work units with higher weights is beneficial because these members can round-robin the monitoring task so that any one member does not have to assume the full cost. Second, in some situations, $v_i \ast r_i$ may be greater than the average amount of work, W/N. Achieving fairness means that $v_i \ast r_i$ defines the quantity of application community members that is assigned to it and the sum of these quantities defines the minimum number of members in the application community.

In some embodiments, each application community member calculates a table. An example of such a table is shown in FIG. 7. Upon generating the table, application community members may place bids to adjust each of their respective workloads. For example, the system may use tokens for bidding. Tokens may map directly to the number of time quanta that an application community member is responsible for monitoring a work unit or a function of an application. The system ensures that each node does not accumulate more than the total number of tokens allowed by the choice of $\epsilon$.

If an application community member monitors more than its share, then the system has increased coverage and can ensure that faults are detected as quickly as possible. As shown in 630 and 640, each application community member may predict that a fault may occur in the assigned portion of code or may detect that a fault has occurred causing the application to abort, where the assigned portion of the code was the source of the fault. As faults are detected, applications members may each proactively monitor assigned portions of code containing the fault to prevent the application from further failures. As discussed previously, the application community member may isolate the portion of the code that caused the fault and use the emulator to test vaccines or fixes. At 650, the application community member that detects or predicts the fault may notify the other application community members. Other application members that have succumbed to the fault may be restarted with the protection mechanisms or fixes generated by the application member that detected the fault.

Assuming a uniform random distribution of new faults across the application community members, the probability of a fault happening at a member, k, is: P (fault)=1/N. Thus, the probability of k detecting a new fault is the probability that the fault happens at k and that k detects the fault: P (fault at k $\wedge$ detection)=$1/N \ast k_i$ where $k_i$ is the percentage of coverage at k. The probability of the application community detecting the fault is:

$$P(AC \text{ detect}) = \sum_{i=1}^{N} \frac{1}{N} \ast k_i$$

As each $k_i$ goes to 100%, the above-equation becomes $$\sum_{i=L}^{N} \frac{1}{N},$$

or N/N, a probability of 1 that the fault is detected when it first occurs. It will also be understood that various embodiments may be presented in terms of program procedures executed on a computer or network of computers.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. However, all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in many cases, in any of the operations described herein in connection with various embodiments; the operations are machine operations. Useful machines for performing the operation of various embodiments include general purpose digital computers or similar devices.

Some embodiments also provide apparatuses for performing these operations. These apparatuses may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the described method. The required structure for a variety of these machines will appear from the description given.

Some embodiments may include a general purpose computer, or a specially programmed special purpose computer. The user may interact with the system via e.g., a personal computer or over PDA, e.g., the Internet an Intranet, etc. Either of these may be implemented as a distributed computer system rather than a single computer. Similarly, the communications link may be a dedicated link, a modem over a POTS line, the Internet and/or any other method of communicating between computers and/or users. Moreover, the processing could be controlled by a software program on one or more computer systems or processors, or could even be partially or wholly implemented in hardware.

Although a single computer may be used, systems according to one or more embodiments are optionally suitably equipped with a multitude or combination of processors or storage devices. For example, the computer may be replaced by, or combined with, any suitable processing system operative in accordance with the concepts of various embodiments, including sophisticated calculators, hand held, laptop/notebook, mini, mainframe and super computers, as well as processing system network combinations of the same. Further, portions of the system may be provided in any appropriate electronic format, including, for example, provided over a communication line as electronic signals, provided on CD and/or DVD, provided on optical disk memory, etc.

Any presently available or future developed computer software language and/or hardware components can be employed in such embodiments. For example, at least some of the functionality mentioned above could be implemented using Visual Basic, C, C++ or any assembly language appropriate in view of the processor being used. It could also be written in an object oriented and/or interpretive environment such as Java and transported to multiple destinations to various users.

Other embodiments, extensions, and modifications of the ideas presented above are comprehended and within the reach of one skilled in the field upon reviewing the present disclosure. Accordingly, the scope of the present invention in its various aspects is not to be limited by the examples and embodiments presented above. The individual aspects of the present invention, and the entirety of the invention are to be regarded so as to allow for modifications and future developments within the scope of the present disclosure. For example, the set of features, or a subset of the features, described above may be used in any suitable combination. The present invention is limited only by the claims that follow.

What is claimed is:

1. A method of computing a model of program execution behavior, the method comprising:
  assigning, using a hardware processor, a first sequence of function calls to a first computing device of an application community and a second sequence of function calls to a second computing device of the application community, wherein the application community includes a plurality of computing devices running a program that executes the first sequence of function calls and the second sequence of function calls;
  receiving a first model of the first sequence of function calls from the first computing device and a second model of the second sequence of function calls from the second computing device;
  modifying a combined model based at least in part on the first model and the second model; and
  notifying at least one of the plurality of computing devices in the application community of an anomalous function call that was detected using the combined model.

2. The method of claim 1, wherein the first computing device of the application community monitors a first portion of the program and the second computing device of the application community monitors a second portion of the program.

3. The method of claim 2, wherein the first portion of the program and the second portion of the program are a same portion of the program.

4. The method of claim 2, wherein the first portion of the program and the second portion of the program are a different portion of the program.

5. The method of claim 1, wherein at least one of the first model and the second model is generated using probabilistic modeling that generates a density estimation of sequences of function calls.

6. The method of claim 5, further comprising:
  applying first and second order consistency checks, wherein the first order consistency check comprises computing a first probability of an observation of a first given feature value and the second order consistency check comprises computing a second probability of the first given feature value given another feature value; and
  identifying the first given feature value as anomalous if at least one of the first probability and the second probability are less than a predetermined threshold probability.

7. The method of claim 1, wherein at least one of the first model and the second model is generated using a one-class support vector machine.

8. The method of claim 1, further comprising:
determining whether a function call from at least one of the first sequence of function calls and the second sequence of function calls has been executed less than a threshold number of times; and
in response to the determination, identifying the function call as having a greater likelihood of including an anomaly.

9. The method of claim 1, further comprising transmitting at least one of the second model from the second computing device to the first computing device and the first model from the first computing device to the second computing device.

10. A system for computing a model of program execution behavior, the system comprising:
a hardware processor that is programmed to:
assign a first sequence of function calls to a first computing device of an application community and a second sequence of function calls to a second computing device of the application community, wherein the application community includes a plurality of computing devices running a program that executes the first sequence of function calls and the second sequence of function calls;
receive a first model of the first sequence of function calls from the first computing device and a second model of the second sequence of function calls from the second computing device;
modify a combined model based at least in part on the first model and the second model; and
notify at least one of the plurality of computing devices in the application community of an anomalous function call that was detected using the combined model.

11. The system of claim 10, wherein the first computing device of the application community monitors a first portion of the program and the second computing device of the application community monitors a second portion of the program.

12. The system of claim 11, wherein the first portion of the program and the second portion of the program are a same portion of the program.

13. The system of claim 11, wherein the first portion of the program and the second portion of the program are a different portion of the program.

14. The system of claim 10, wherein at least one of the first model and the second model is generated using probabilistic modeling that generates a density estimation of sequences of function calls.

15. The system of claim 14, wherein the hardware processor is further programmed to:
apply first and second order consistency checks, wherein the first order consistency check comprises computing a first probability of an observation of a first given feature value and the second order consistency check comprises computing a second probability of the first given feature value given another feature value; and
identify the first given feature value as anomalous if at least one of the first probability and the second probability are less than a predetermined threshold probability.

16. The system of claim 10, wherein at least one of the first model and the second model is generated using a one-class support vector machine.

17. The system of claim 10, wherein the hardware processor is further programmed to:
determine whether a function call from at least one of the first sequence of function calls and the second sequence of function calls has been executed less than a threshold number of times; and
in response to the determination, identify the function call as having a greater likelihood of including an anomaly.

18. The system of claim 10, wherein the hardware processor is further programmed to transmit at least one of the second model from the second computing device to the first computing device and the first model from the first computing device to the second computing device.

19. A non-transitory computer-readable medium containing computer executable instructions that, when executed by a processor, cause the processor to perform a method of computing a model of program execution behavior, the method comprising:
assigning a first sequence of function calls to a first computing device of an application community and a second sequence of function calls to a second computing device of the application community, wherein the application community includes a plurality of computing devices running a program that executes the first sequence of function calls and the second sequence of function calls;
receiving a first model of the first sequence of function calls from the first computing device and a second model of the second sequence of function calls from the second computing device;
modifying a combined model based at least in part on the first model and the second model; and
notifying at least one of the plurality of computing devices in the application community of an anomalous function call that was detected using the combined model.

* * * * *